United States Patent
Ge et al.

(10) Patent No.: US 11,892,720 B2
(45) Date of Patent: Feb. 6, 2024

(54) DISPLAY SCREEN SHIELD LINE SYSTEM

(71) Applicant: Apple Inc., Cupertino, CA (US)

(72) Inventors: Zhibing Ge, Los Altos, CA (US);
Cheng-Ho Yu, Milpitas, CA (US);
Young-Bae Park, San Jose, CA (US);
Abbas Jamshidi Roudbari, Saratoga, CA (US); Shih-Chang Chang, Cupertino, CA (US); Cheng Chen, San Jose, CA (US); Marduke Yousefpor, San Jose, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 218 days.

(21) Appl. No.: 17/006,441

(22) Filed: Aug. 28, 2020

(65) Prior Publication Data

US 2020/0393715 A1    Dec. 17, 2020

Related U.S. Application Data

(62) Division of application No. 13/126,416, filed as application No. PCT/US2011/027092 on Mar. 3, 2011, now Pat. No. 10,761,358.

(51) Int. Cl.
*G06F 3/044* (2006.01)
*G02F 1/1333* (2006.01)
(Continued)

(52) U.S. Cl.
CPC ........ *G02F 1/13338* (2013.01); *G02F 1/1362* (2013.01); *G06F 3/044* (2013.01);
(Continued)

(58) Field of Classification Search
CPC ............... G02F 1/13338; G02F 1/1362; G02F 1/134318; G02F 1/134372;
(Continued)

(56) References Cited

U.S. PATENT DOCUMENTS 4,827,085 A * 5/1989 Yaniv ..................... G06F 3/045
                                                                        379/93.19
5,483,261 A    1/1996 Yasutake
(Continued)

FOREIGN PATENT DOCUMENTS

EP    2214084 A1    8/2010
JP    2000-163031 A    6/2000
(Continued)

OTHER PUBLICATIONS

International Search Report Received for PCT Patent Application No. PCT/US2011/027092, dated Jul. 29, 2011, 4 pages.
(Continued)

*Primary Examiner* — Jeff Piziali
(74) *Attorney, Agent, or Firm* — Kubota & Basol LLP

(57) ABSTRACT

Electrical shield line systems are provided for openings in common electrodes near data lines of display and touch screens. Some displays, including touch screens, can include multiple common electrodes (Vcom) that can have openings between individual Vcoms. Some display screens can have an open slit between two adjacent edges of Vcom. Openings in Vcom can allow an electric field to extend from a data line through the Vcom layer. A shield can be disposed over the Vcom opening to help reduce or eliminate an electric field from affecting a pixel material, such as liquid crystal. The shield can be connected to a potential such that electric field is generated substantially between the shield and the data line to reduce or eliminate electric fields reaching the liquid crystal.

12 Claims, 23 Drawing Sheets

(51) Int. Cl.
    *G06F 3/041* (2006.01)
    *G02F 1/1362* (2006.01)
    *G02F 1/1343* (2006.01)
(52) U.S. Cl.
    CPC .......... *G06F 3/0412* (2013.01); *G06F 3/0445* (2019.05); *G02F 1/134318* (2021.01); *G02F 1/134372* (2021.01); *G02F 1/136218* (2021.01); *G02F 1/136286* (2013.01); *G06F 2203/04107* (2013.01)
(58) Field of Classification Search
    CPC ......... G02F 1/136218; G02F 1/136286; G06F 3/0412; G06F 3/044; G06F 3/0445; G06F 2203/04107
    See application file for complete search history.

(56) References Cited

U.S. PATENT DOCUMENTS

| | | | |
|---|---|---|---|
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 2006/0026521 A1 | 2/2006 | Hotelling et al. | |
| 2006/0197753 A1 | 9/2006 | Hotelling | |
| 2008/0180624 A1 | 7/2008 | Choi et al. | |
| 2009/0046077 A1* | 2/2009 | Tanaka | G06F 3/0444 345/174 |
| 2009/0122021 A1 | 5/2009 | Liu et al. | |
| 2009/0159344 A1 | 6/2009 | Hotelling et al. | |
| 2009/0167718 A1 | 7/2009 | Lee et al. | |
| 2009/0225250 A1 | 9/2009 | Lyu et al. | |
| 2009/0256818 A1* | 10/2009 | Noguchi | G06F 3/0445 345/174 |
| 2009/0273570 A1 | 11/2009 | Degner et al. | |
| 2009/0273577 A1 | 11/2009 | Chen et al. | |
| 2009/0284492 A1* | 11/2009 | Chino | G06F 3/0445 345/174 |
| 2010/0001973 A1* | 1/2010 | Hotelling | G02F 1/136286 455/566 |
| 2010/0194699 A1* | 8/2010 | Chang | G06F 3/0443 345/173 |
| 2010/0194707 A1* | 8/2010 | Hotelling | G06F 3/041 345/55 |
| 2010/0231544 A1* | 9/2010 | Lu | G06F 3/0412 174/250 |
| 2012/0313881 A1* | 12/2012 | Ge | G06F 3/044 345/174 |
| 2013/0241847 A1* | 9/2013 | Shaffer | G06F 3/04883 345/173 |

FOREIGN PATENT DOCUMENTS

| | | |
|---|---|---|
| JP | 2002-342033 A | 11/2002 |
| WO | 2012/118513 A1 | 9/2012 |

OTHER PUBLICATIONS dictionary.com "Adjacent", Unabridged, Source location: Random House, Inc., Available online at: <https://dictionary.reference.com/browse/adjacent>, Nov. 18, 2011, p. 1.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Final Office Action received for U.S. Appl. No. 13/126,416, dated Feb. 5, 2019, 16 pages.
Final Office Action received for U.S. Appl. No. 13/126,416, dated Sep. 15, 2014, 14 pages.
Non-Final Office Action received for U.S. Appl. No. 13/126,416, dated Jul. 17, 2015, 18 pages.
Non-Final Office Action received for U.S. Appl. No. 13/126,416, dated Nov. 6, 2013, 26 pages.
Notice of Allowance received for U.S. Appl. No. 13/126,416, dated May 1, 2020, 11 pages.
Restriction Requirement received for U.S. Appl. No. 13/126,416, dated Jul. 23, 2013, 11 pages.

* cited by examiner

DISPLAY SCREEN SHIELD LINE SYSTEM

CROSS-REFERENCE TO RELATED APPLICATIONS

This application is a division of U.S. patent application Ser. No. 13/126,416, filed Apr. 27, 2011, published on Dec. 13, 2012 as U.S. Publication No. 2012/0313881, which is a National Phase patent application under 35 U.S.C. § 371 of International Application No. PCT/US2011/027092, filed Mar. 3, 2011, the entire disclosures of which are incorporated herein by reference for all purposes.

FIELD OF THE DISCLOSURE

This relates generally to electrical shield systems in display screens, and more particularly, to electrical shield line systems for openings in common electrodes near data lines of display screens.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing fields used to detect touch can extend beyond the surface of the display, and objects approaching near the surface may be detected near the surface without actually touching the surface.

Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. Some touch screens can be formed by integrating touch sensing circuitry into a display pixel stackup (i.e., the stacked material layers forming the display pixels).

Touch screens, or more fundamentally display screens, can suffer from negative visual artifacts caused by the disinclination of material such as liquid crystal resulting from electric fields emanating from the data lines of the display.

SUMMARY

This relates to electrical shield line systems for openings in common electrodes near data lines of display and touch screens. Some displays, including touch screens, can include multiple common electrodes (Vcom) that can have openings between individual Vcoms. For example, some display screens can have an open slit between two adjacent edges of Vcom. Openings in Vcom can allow an electric field to extend from a data line through the Vcom layer. A shield can be disposed over the Vcom opening to help reduce or eliminate an electric field from affecting a pixel material, such as liquid crystal, and reduce or eliminate a corresponding visual artifact due to the electric field. The shield can be connected to a voltage source such that electric field is generated substantially between the shield and the data line to reduce or eliminate electric fields reaching the liquid crystal, for example. In this way, visual artifacts caused by disinclination of liquid crystal material resulting from electric fields emanating from data lines can be reduced or eliminated.

DETAILED DESCRIPTION

In the following description of example embodiments, reference is made to the accompanying drawings which form a part hereof, and in which it is shown by way of illustration specific embodiments in which embodiments of the disclosure can be practiced. It is to be understood that other embodiments can be used and structural changes can be made without departing from the scope of the embodiments of this disclosure.

This relates to electrical shield line systems for openings in common electrodes near data lines of display and touch screens. Some displays, including touch screens, can include multiple common electrodes (Vcom) that can have openings between individual Vcoms. For example, some display screens can have an open slit between two adjacent edges of Vcom. Openings in Vcom can allow an electric field to extend from a data line through the Vcom layer. A shield can be disposed over the Vcom opening to help reduce or eliminate an electric field from affecting a pixel material, such as liquid crystal, and reduce or eliminate a corresponding visual artifact due to the electric field. The shield can be connected to a voltage source such that electric field is generated substantially between the shield and the data line to reduce or eliminate electric fields reaching the liquid crystal, for example. In this way, visual artifacts caused by disinclination of liquid crystal material resulting from electric fields emanating from data lines can be reduced or eliminated.

Figure 1C:
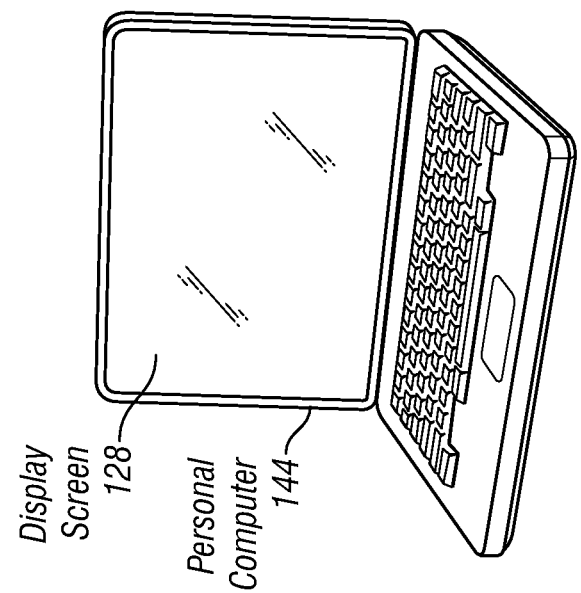
FIGS. 1A-1D illustrate an example mobile telephone, an example media player, an example personal computer, and an example display that each include an example display screen (which can be part of a touch screen) according to embodiments of the disclosure.
Figure 1B:
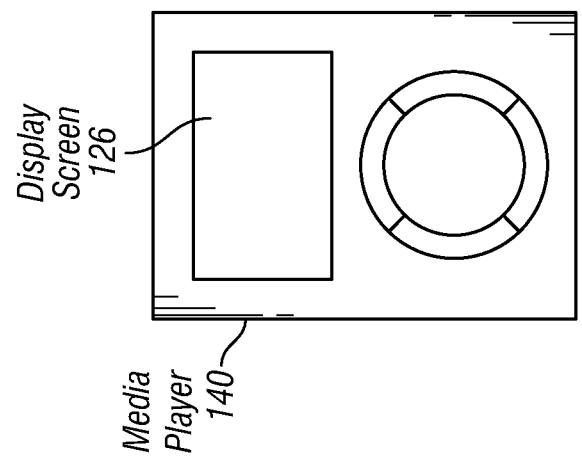
Figure 1A:
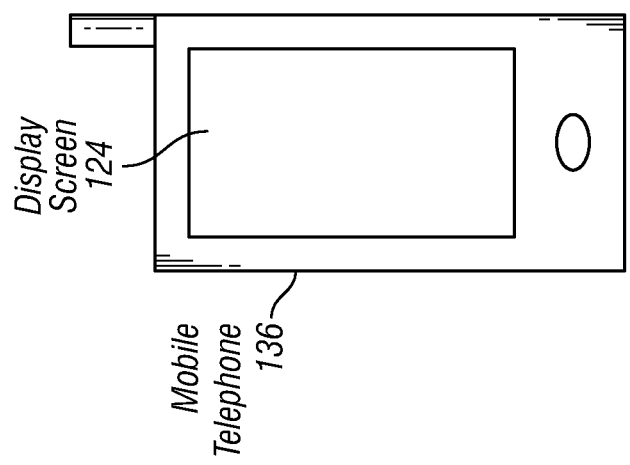

FIGS. 1A-1D show example systems in which display screens (which can be part of touch screens) according to embodiments of the disclosure may be implemented. FIG. 1A illustrates an example mobile telephone 136 that includes a display screen 124. FIG. 1B illustrates an example digital media player 140 that includes a display screen 126. FIG. 1C illustrates an example personal computer 144 that includes a display screen 128.

Figure 1D:
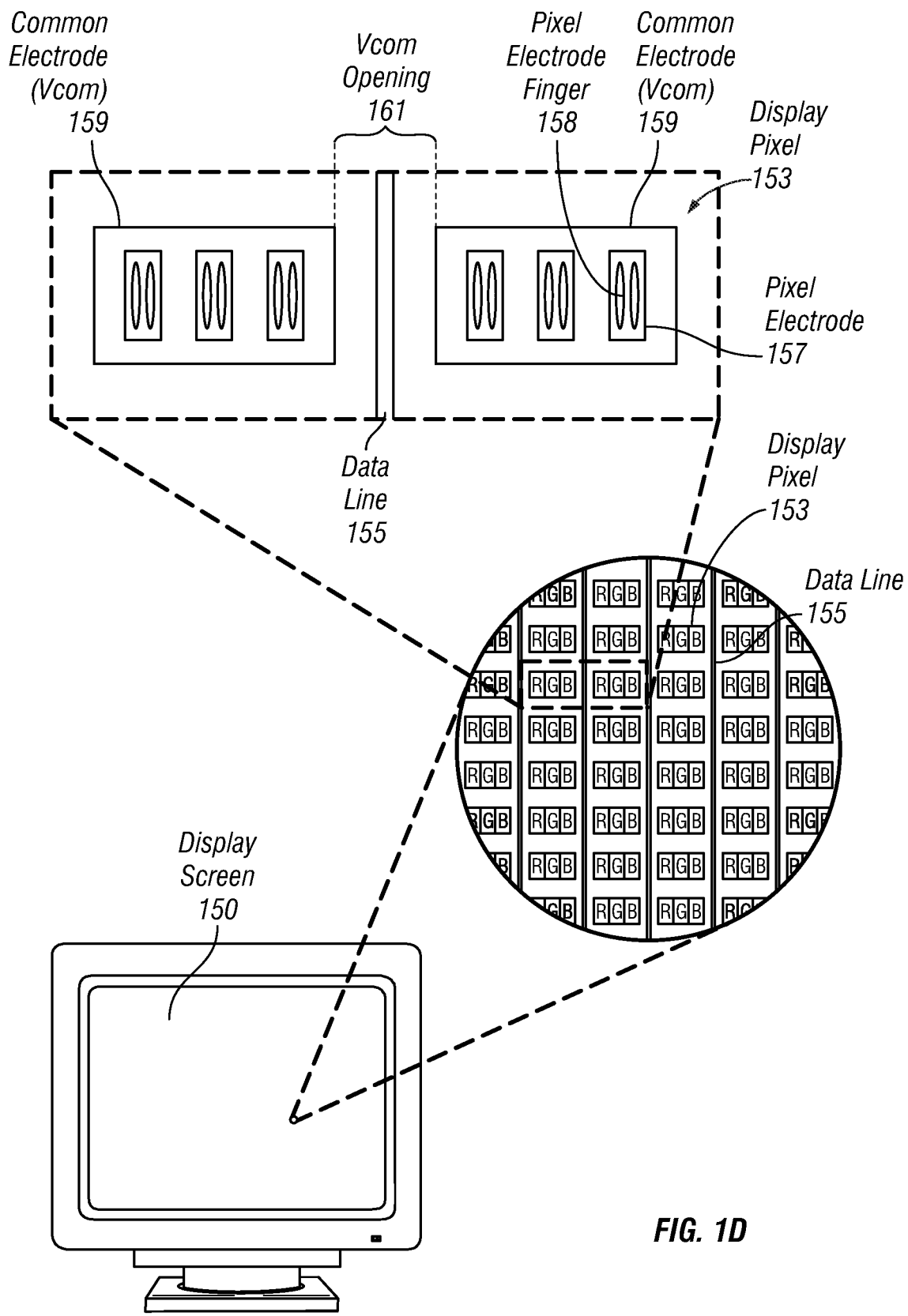

FIG. 1D illustrates some details of an example display screen 150. FIG. 1D includes a magnified view of display screen 150 that shows multiple display pixels 153, each of which can include multiple display sub-pixels, such as red (R), green (G), and blue (B) sub-pixels in an RGB display, for example. The magnified view also shows data lines 155 between each display pixel 153.

FIG. 1D also includes a magnified view of two of the display pixels 153, which illustrates that each display pixel can include pixel electrodes 157, each of which can correspond to one of the sub-pixels, for example. Each pixel electrode can include a plurality of pixel electrode fingers 158. Each display pixel can include a common electrode (Vcom) 159 that can be used in conjunction with pixel electrodes 157 to operate the display pixel, as will be described below in more detail. In this example embodiment, the Vcom 159 of adjacent display pixels 153 can be separated by an opening, Vcom opening 161. The data line 155 between the two display pixels 155 can be disposed under Vcom opening 161. In this example embodiment, a single data line 155 can be used to operate all three pixel electrodes 157 in a display pixel 153, for example, by multiplexing the data line, while in other embodiments, the sub-pixels of a display pixel can be operated by separate data lines. In some embodiments, common electrodes can span multiple display pixels of the display screen, such as a single Vcom spanning a rectangular or other shape area of display pixels, and Vcom openings can be formed between these larger areas of Vcom.

In some embodiments, display screens 124, 126, 128, and 150 can be touch screens in which touch sensing circuitry can be integrated into the display pixels. For example, in some embodiments, common electrodes such as Vcom 159 can be conductively connected together to form circuitry used by the touch sensing system. Touch sensing can be based on, for example, self capacitance or mutual capacitance, or another touch sensing technology in which effects of parasitic capacitances can be equalized. For example, in a self capacitance based touch system, an individual electrode with a self-capacitance to ground can be used to form a touch pixel for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen. A mutual capacitance based touch system can include, for example, drive regions and sense regions, such as drive lines and sense lines. For example, drive lines can be formed in rows while sense lines can be formed in columns (e.g., orthogonal). Touch pixels can be formed at the "cross-overs" or adjacencies of the rows and columns. It is understood that the drive and sense lines do not actually touch each other at the "cross-overs" or adjacencies, and for example, a dielectric layer, a break in a conductive path, etc., can be disposed between drive and sense lines at the "cross-overs" or adjacencies. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some embodiments, a touch screen can be multi-touch, single touch, projection scan, full-imaging multi-touch, or any capacitive touch.

FIGS. 2-6 show example systems in which display screens with touch sensing circuitry according to embodiments of the disclosure may be implemented.

Figure 2:
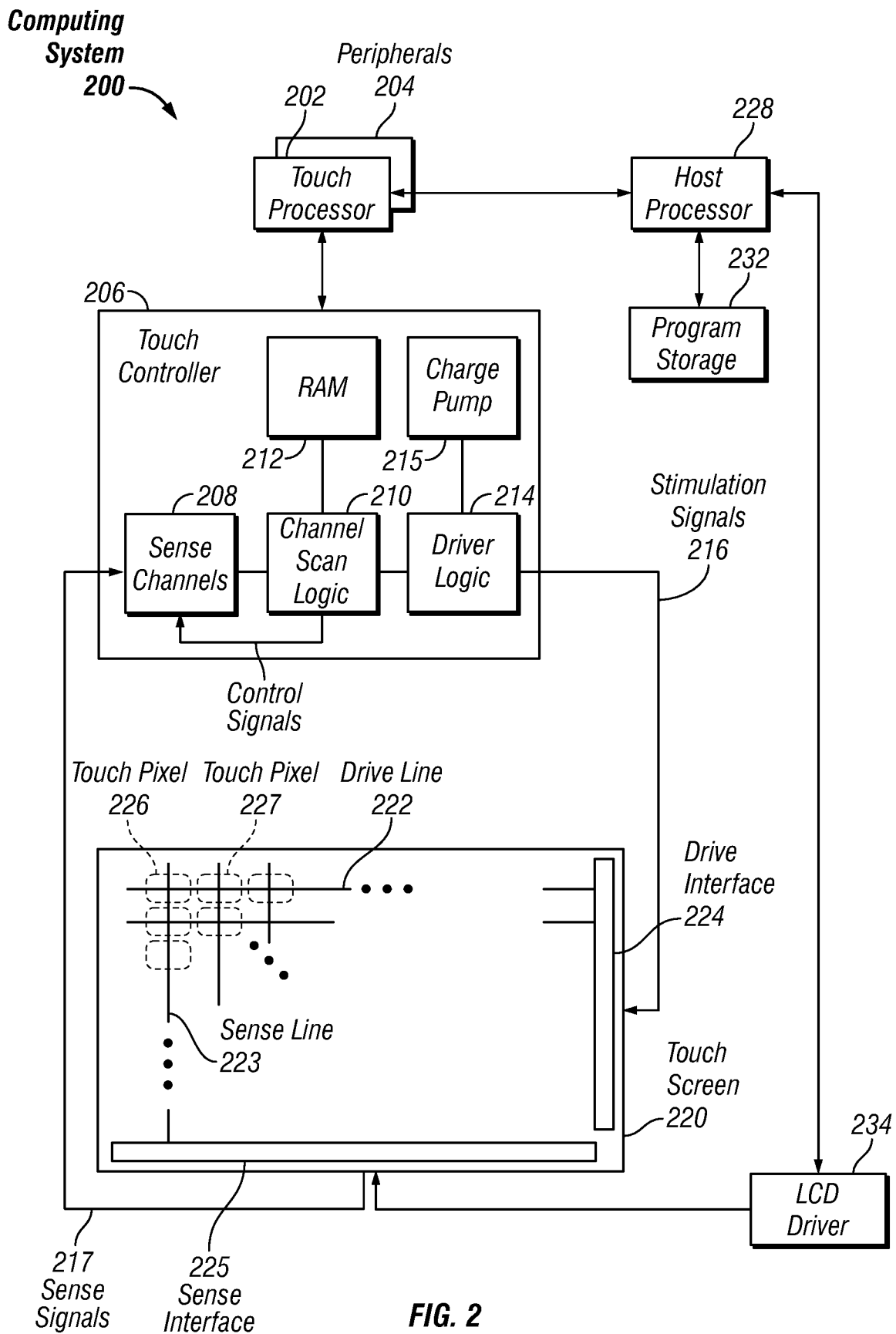
FIG. 2 is a block diagram of an example computing system that illustrates one implementation of an example touch screen according to embodiments of the disclosure.

FIG. 2 is a block diagram of an example computing system 200 that illustrates one implementation of an example touch screen 220 according to embodiments of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive regions of the touch sensing circuitry of touch screen 220, as described in more detail below. In some embodiments, touch controller 206, touch processor 202 and peripherals 204 can be integrated into a single application specific integrated circuit (ASIC).

Computing system 200 can also include a host processor 228 for receiving outputs from touch processor 202 and performing actions based on the outputs. For example, host processor 228 can be connected to program storage 232 and a display controller, such as an LCD driver 234. Host processor 228 can use LCD driver 234 to generate an image on touch screen 220, such as an image of a user interface (UI), and can use touch processor 202 and touch controller 206 to detect a touch on or near touch screen 220, such a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g. a pattern of fingers touching the touch screen).

Figure 3:
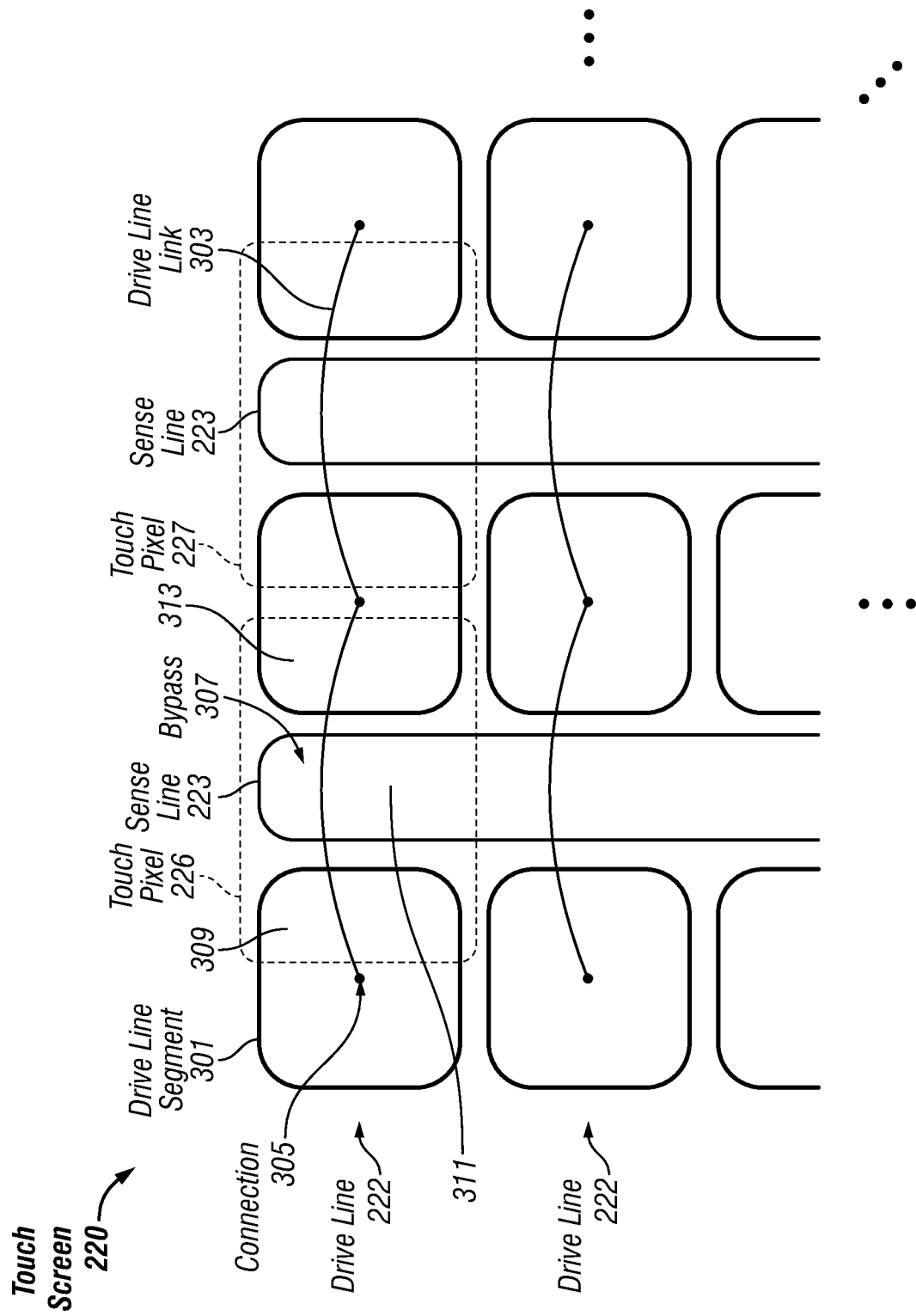
FIG. 3 is a more detailed view of the touch screen of FIG. 2 showing an example configuration of drive lines and sense lines according to embodiments of the disclosure.

In some example embodiments, touch screen 220 can be an integrated touch screen in which touch sensing circuit elements of the touch sensing system can be integrated into the display pixels stackups of a display. An example integrated touch screen in which embodiments of the disclosure can be implemented with now be described with reference to FIGS. 3-6. FIG. 3 is a more detailed view of touch screen 220 showing an example configuration of drive lines 222 and sense lines 223 according to embodiments of the disclosure. As shown in FIG. 3, each drive line 222 can be formed of one or more drive line segments 301 that can be electrically connected by drive line links 303 at connections 305. Drive line links 303 are not electrically connected to sense lines 223, rather, the drive line links can bypass the sense lines through bypasses 307. Drive lines 222 and sense lines 223 can interact capacitively to form touch pixels such as touch pixels 226 and 227. Drive lines 222 (i.e., drive line segments 301 and corresponding drive line links 303) and sense lines 223 can be formed of electrical circuit elements in touch screen 220. In the example configuration of FIG. 3, each of touch pixels 226 and 227 can include a portion of one drive line segment 301, a portion of a sense line 223, and a portion of another drive line segment 301. For example, touch pixel 226 can include a right-half portion 309 of a drive line segment on one side of a portion 311 of a sense line, and a left-half portion 313 of a drive line segment on the opposite side of portion 311 of the sense line.

Figure 4:
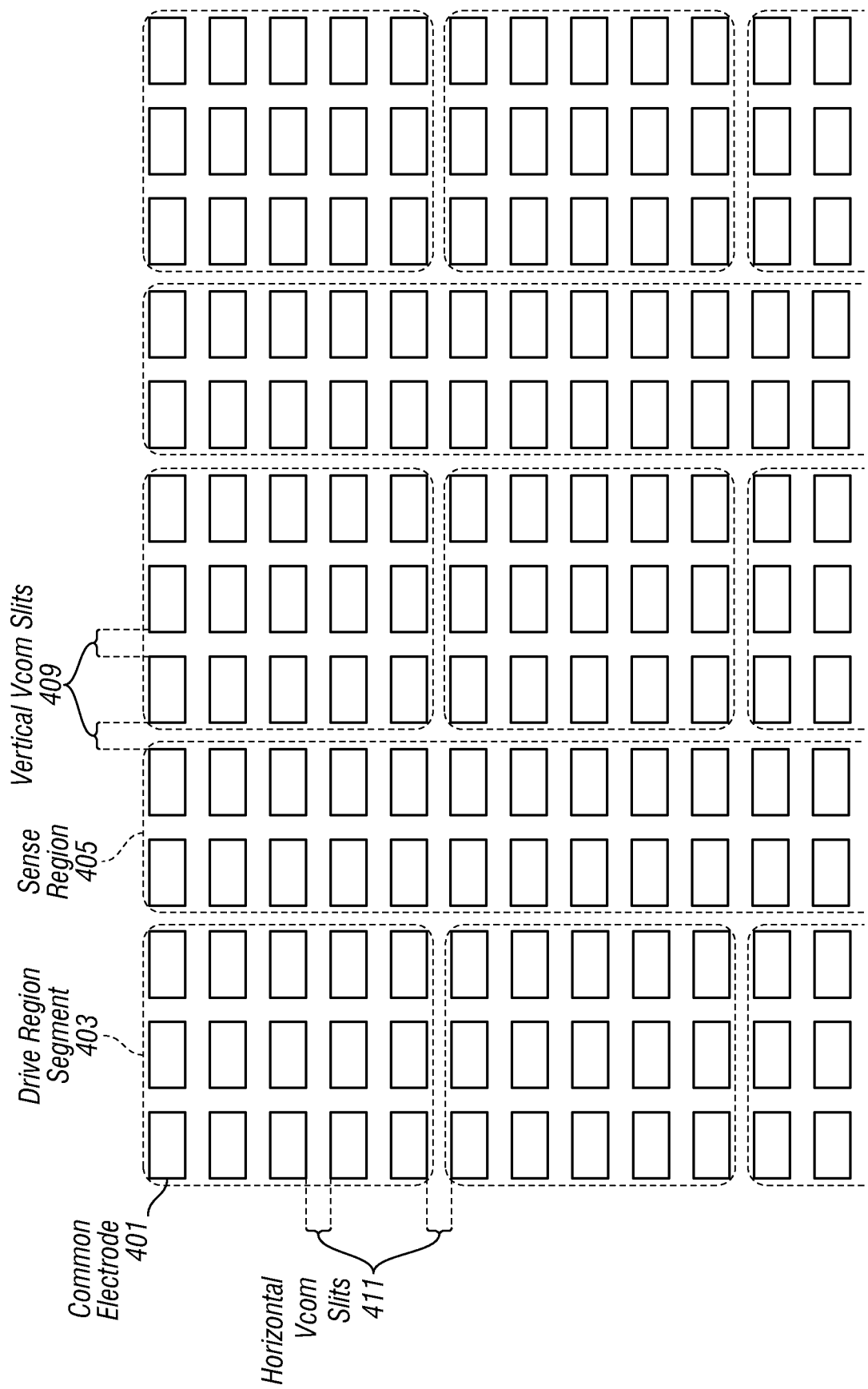
FIG. 4 illustrates an example configuration in which touch sensing circuitry includes common electrodes (Vcom) according to embodiments of the disclosure.

The circuit elements can include, for example, elements that can exist in conventional LCD displays, as described above. It is noted that circuit elements are not limited to whole circuit components, such a whole capacitor, a whole transistor, etc., but can include portions of circuitry, such as only one of the two plates of a parallel plate capacitor. FIG. 4 illustrates an example configuration in which common electrodes (Vcom) can form portions of the touch sensing circuitry of a touch sensing system. Each display pixel can include a common electrode 401, which is a circuit element of the display system circuitry in the pixel stackup (i.e., the stacked material layers forming the display pixels) of the display pixels of some types of conventional LCD displays, e.g., fringe field switching (FFS) displays, that can operate as part of the display system to display an image.

In the example shown in FIG. 4, each common electrode (Vcom) 401 can serve as a multi-function circuit element that can operate as display circuitry of the display system of touch screen 220 and can also operate as touch sensing circuitry of the touch sensing system. In this example, each common electrode 401 can operate as a common electrode of the display circuitry of the touch screen, and can also operate together when grouped with other common electrodes as touch sensing circuitry of the touch screen. For example, a group of common electrodes 401 can operate together as a capacitive part of a drive line or a sense line of the touch sensing circuitry during the touch sensing phase. Other circuit elements of touch screen 220 can form part of the touch sensing circuitry by, for example, electrically connecting together common electrodes 401 of a region, switching electrical connections, etc. In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some embodiments, some of the circuit elements in the display pixel stackups can be multi-function circuit elements and other circuit elements may be single-function circuit elements. In other embodiments, all of the circuit elements of the display pixel stackups may be single-function circuit elements.

For example, FIG. 4 shows common electrodes (Vcom) 401 grouped together to form drive region segments 403 and sense regions 405 that generally correspond to drive line segments 301 and sense lines 223, respectively. Grouping multi-function circuit elements of display pixels into a region can mean operating the multi-function circuit elements of the display pixels together to perform a common function of the region. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc. For example, individual common electrodes 401 within each drive and sense region can be conductively connected together along rows, along column, along both rows and columns, etc. In some embodiments, a single common electrode can span multiple display pixels in a region, such as a drive region or sense region. For example, in some embodiments, each drive region segment can include a single Vcom spanning all of the display pixels in the drive region segment.

Multi-function circuit elements of display pixels of the touch screen can operate in both the display phase and the touch phase. For example, during a touch phase, common electrodes 401 can be grouped together to form touch signal lines, such as drive regions and sense regions. In some embodiments circuit elements can be grouped to form a continuous touch signal line of one type and a segmented touch signal line of another type. For example, FIG. 4 shows one example embodiment in which drive region segments 403 and sense regions 405 correspond to drive line segments 301 and sense lines 223 of touch screen 220. Other configurations are possible in other embodiments, for example, common electrodes 401 could be grouped together such that drive lines are each formed of a continuous drive region and sense lines are each formed of a plurality of sense region segments linked together through connections that bypass a drive region.

The example configuration of Vcom 401 shown in FIG. 4 can include vertical Vcom slits 409, which can be between edges of Vcoms of different operational regions, such as drive and sense regions, or can be between edges of Vcoms within the same operational region. Likewise, horizontal Vcom slits can be between or within operation regions. Similar to the example embodiment shown in FIG. 1D, data lines can be disposed under Vcom slits, such as the vertical or horizontal Vcom slits.

The drive regions in the example of FIG. 3 are shown in FIG. 4 as rectangular regions including a plurality of common electrodes of display pixels, and the sense regions of FIG. 3 are shown in FIG. 4 as rectangular regions including a plurality of common electrodes of display pixels extending the vertical length of the LCD. In some embodiments, a touch pixel of the configuration of FIG. 4 can include, for example, a 64×64 area of display pixels. However, the drive and sense regions are not limited to the shapes, orientations, and positions shown, but can include any suitable configurations according to embodiments of the disclosure. It is to be understood that the display pixels used to form the touch pixels are not limited to those described above, but can be any suitable size or shape to permit touch capabilities according to embodiments of the disclosure.

Figure 5:
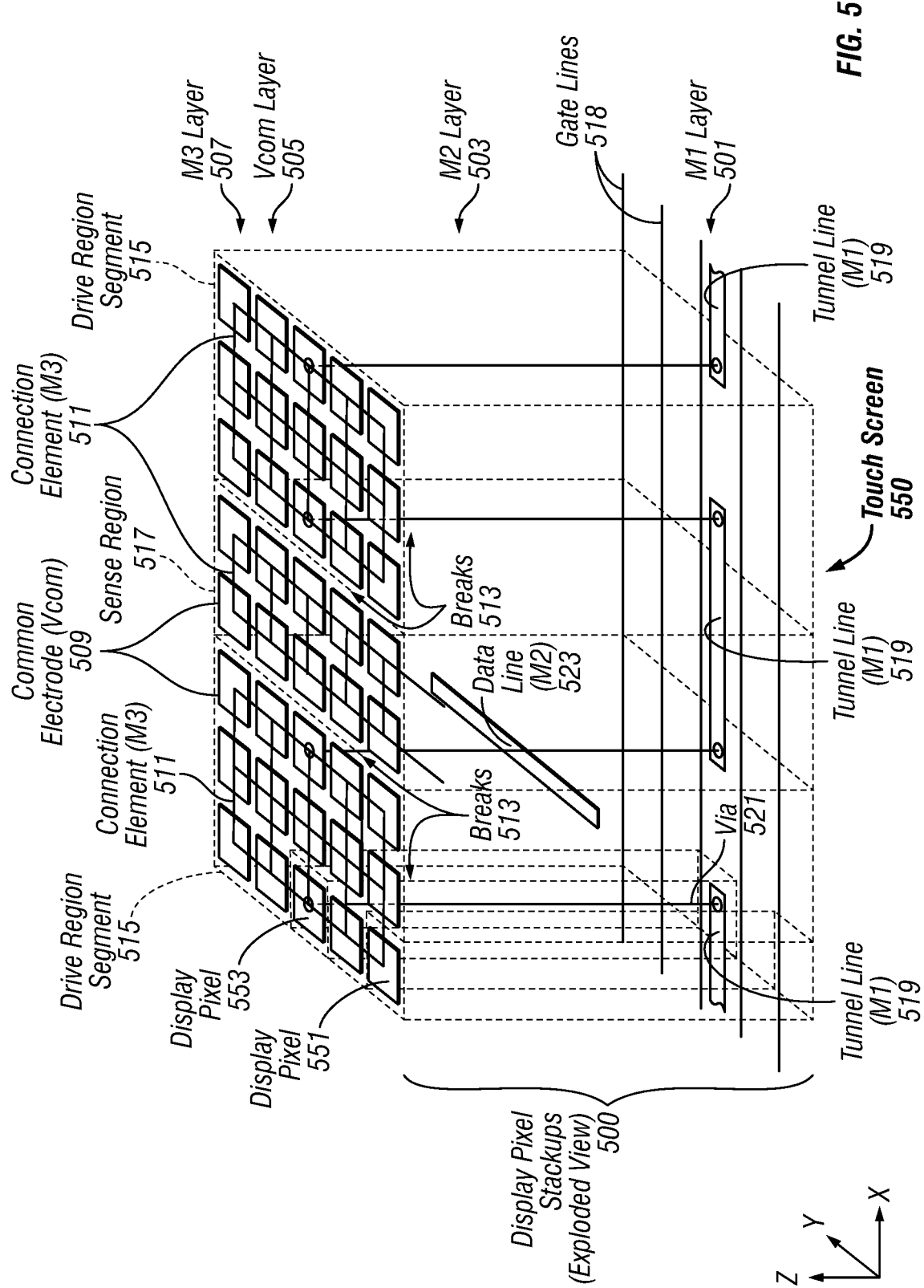
FIG. 5 illustrates an exploded view of display pixel stackups according to embodiments of the disclosure.

FIG. 5 is a three-dimensional illustration of an exploded view (expanded in the z-direction) of example display pixel stackups 500 showing some of the elements within the pixel stackups of an example integrated touch screen 550. Stackups 500 can include a configuration of conductive lines that can be used to group common electrodes, such as common electrodes 401, into drive region segments and sense regions, such as shown in FIG. 4, and to link drive region segments to form drive lines.

Stackups 500 can include elements in a first metal (M1) layer 501, a second metal (M2) layer 503, a common electrode (Vcom) layer 505, and a third metal (M3) layer 507. Each display pixel can include a common electrode 509, such as common electrodes 401 in FIG. 4, that is formed in Vcom layer 505. M3 layer 507 can include connection element 511 that can electrically connect together common electrodes 509. In some display pixels, breaks 513 can be included in connection element 511. Together with the Vcom slits between edges of Vcoms, breaks 513 can serve to separate different groups of common electrodes 509 to form drive region segments 515 and a sense region 517, such as drive region segments 403 and sense region 405, respectively. Breaks 513 can include breaks in the x-direction that can separate drive region segments 515 from sense region 517, and breaks in the y-direction that can separate one drive region segment 515 from another drive region segment. In the example embodiment shown in FIG. 5, connection elements 511 can connect common electrodes 509 within each drive region segment 515 and each sense region 517 along both rows (first or x direction) and columns (y or second direction, orthogonal to the first direction). M1 layer 501 can include gate lines 518. M1 layer 501 can include tunnel lines (also referred to as "bypass lines") 519 that can electrically connect together drive region segments 515 through connections, such as conductive vias 521, which can electrically connect tunnel line 519 to the grouped common electrodes in drive region segment display pixels. Tunnel line 519 can run through the display pixels in sense region 517 with no connections to the grouped common electrodes in the sense region, e.g., no vias 521 in the sense region. One or more tunnel lines 519 can be used to connect drive region segments together. M2 layer 503 can include data lines 523. Only one data line 523 is shown for the sake of clarity; however, a touch screen can include multiple data lines running through each vertical row of pixels, for example, one multiplexed data line for each red, green, blue (RGB) color sub-pixel in each pixel in a vertical row of an RGB display integrated touch screen.

Structures such as connection elements 511, tunnel lines 519, and conductive vias 521 can operate as a touch sensing circuitry of a touch sensing system to detect touch during a touch sensing phase of the touch screen. Structures such as data lines 523, along with other pixel stackup elements such as transistors, pixel electrodes, common voltage lines, gate lines, etc. (not shown), can operate as display circuitry of a display system to display an image on the touch screen during a display phase. Structures such as common electrodes 509 can operate as multifunction circuit elements that can operate as part of both the touch sensing system and the display system.

For example, in operation during a touch sensing phase, stimulation signals can be transmitted through a row of drive region segments 515 connected by tunnel lines 519 and conductive vias 521 to form electric fields between the stimulated drive region segments and sense region 517 to create touch pixels, such as touch pixel 226 in FIG. 2. In this way, the row of connected together drive region segments 515 can operate as a drive line, such as drive line 222, and sense region 517 can operate as a sense line, such as sense line 223. When an object such as a finger approaches or touches a touch pixel, the object can affect the electric fields extending between the drive region segments 515 and the sense region 517, thereby reducing the amount of charge capacitively coupled to the sense region. This reduction in charge can be sensed by a sense channel of a touch sensing controller connected to the touch screen, such as touch controller 206 shown in FIG. 2, and stored in a memory along with similar information of other touch pixels to create an "image" of touch.

Figure 6:
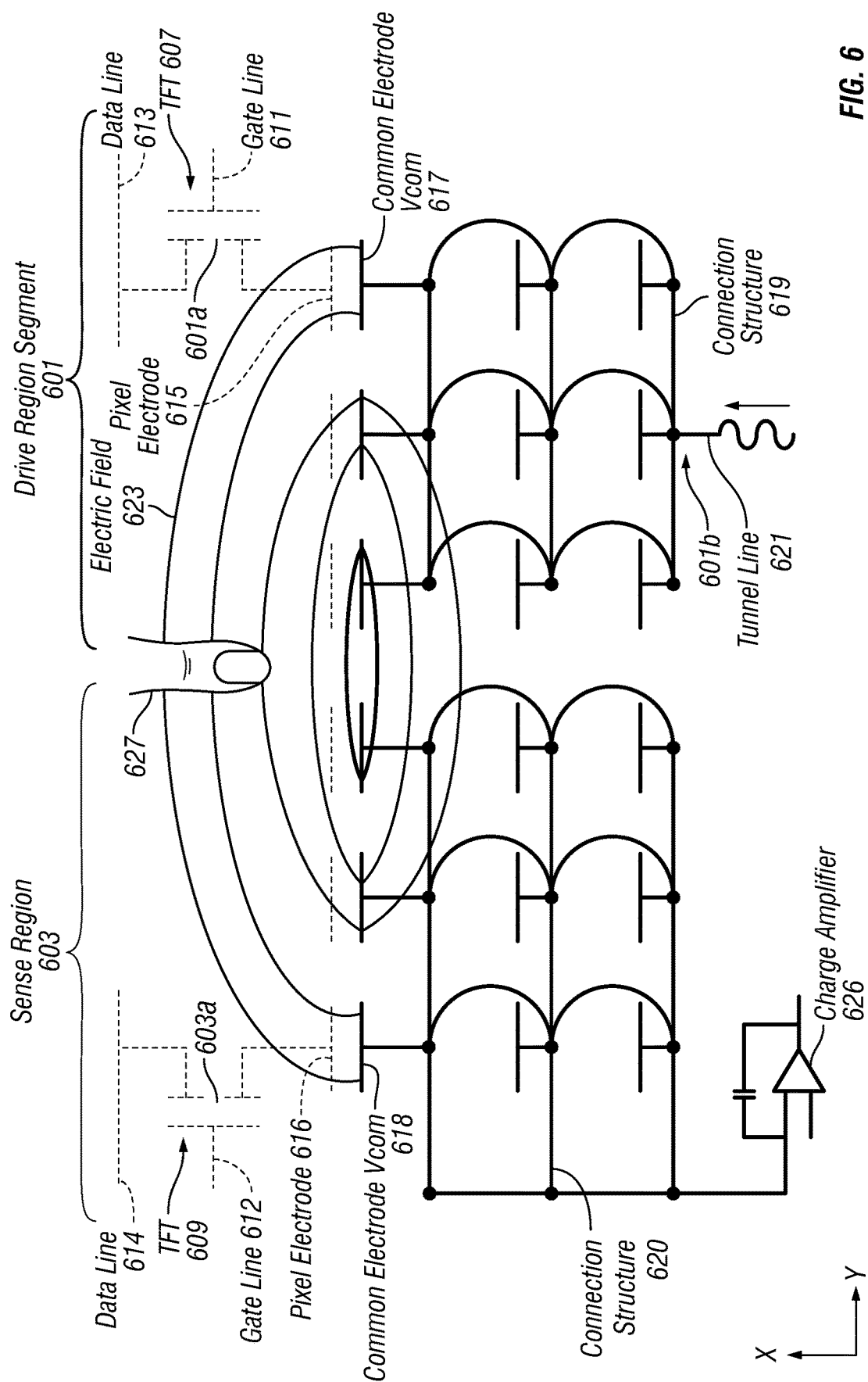
FIG. 6 illustrates an example touch sensing operation according to embodiments of the disclosure.

A touch sensing operation according to embodiments of the disclosure will be described with reference to FIG. 6. FIG. 6 shows partial circuit diagrams of some of the touch sensing circuitry within display pixels in a drive region segment 601 and a sense region 603 of an example touch screen according to embodiments of the disclosure. For the sake of clarity, only one drive region segment is shown. Also for the sake of clarity, FIG. 6 includes circuit elements illustrated with dashed lines to signify some circuit elements operate primarily as part of the display circuitry and not the touch sensing circuitry. In addition, a touch sensing operation is described primarily in terms of a single display pixel 601a of drive region segment 601 and a single display pixel 603a of sense region 603. However, it is understood that other display pixels in drive region segment 601 can include the same touch sensing circuitry as described below for display pixel 601a, and the other display pixels in sense region 603 can include the same touch sensing circuitry as described below for display pixel 603a. Thus, the description of the operation of display pixel 601a and display pixel 603a can be considered as a description of the operation of drive region segment 601 and sense region 603, respectively.

Referring to FIG. 6, drive region segment 601 includes a plurality of display pixels including display pixel 601a. Display pixel 601a can include a TFT 607, a gate line 611, a data line 613, a pixel electrode 615, and a common electrode 617. FIG. 6 shows common electrode 617 connected to the common electrodes in other display pixels in drive region segment 601 through a connection element 619 within the display pixels of drive region segment 601 that is used for touch sensing as described in more detail below. Sense region 603 includes a plurality of display pixels including display pixel 603a. Display pixel 603a includes a TFT 609, a gate line 612, a data line 614, a pixel electrode 616, and a common electrode 618. FIG. 6 shows common electrode 618 connected to the common electrodes in other display pixels in sense region 603 through a connection element 620 that can be connected, for example, in a border region of the touch screen to form an element within the display pixels of sense region 603 that is used for touch sensing as described in more detail below.

During a touch sensing phase, drive signals can be applied to common electrodes 617 through a tunnel line 621 that is electrically connected to a portion of connection element 619 within a display pixel 601b of drive region segment 601. The drive signals, which are transmitted to all common electrodes 617 of the display pixels in drive region segment 601 through connection element 619, can generate an electrical field 623 between the common electrodes of the drive region segment and common electrodes 618 of sense region 603, which can be connected to a sense amplifier, such as a charge amplifier 626. Electrical charge can be injected into the structure of connected common electrodes of sense region 603, and charge amplifier 626 converts the injected charge into a voltage that can be measured. The amount of charge injected, and consequently the measured voltage, can depend on the proximity of a touch object, such as a finger 627, to the drive and sense regions. In this way, the measured voltage can provide an indication of touch on or near the touch screen.

Figure 7:
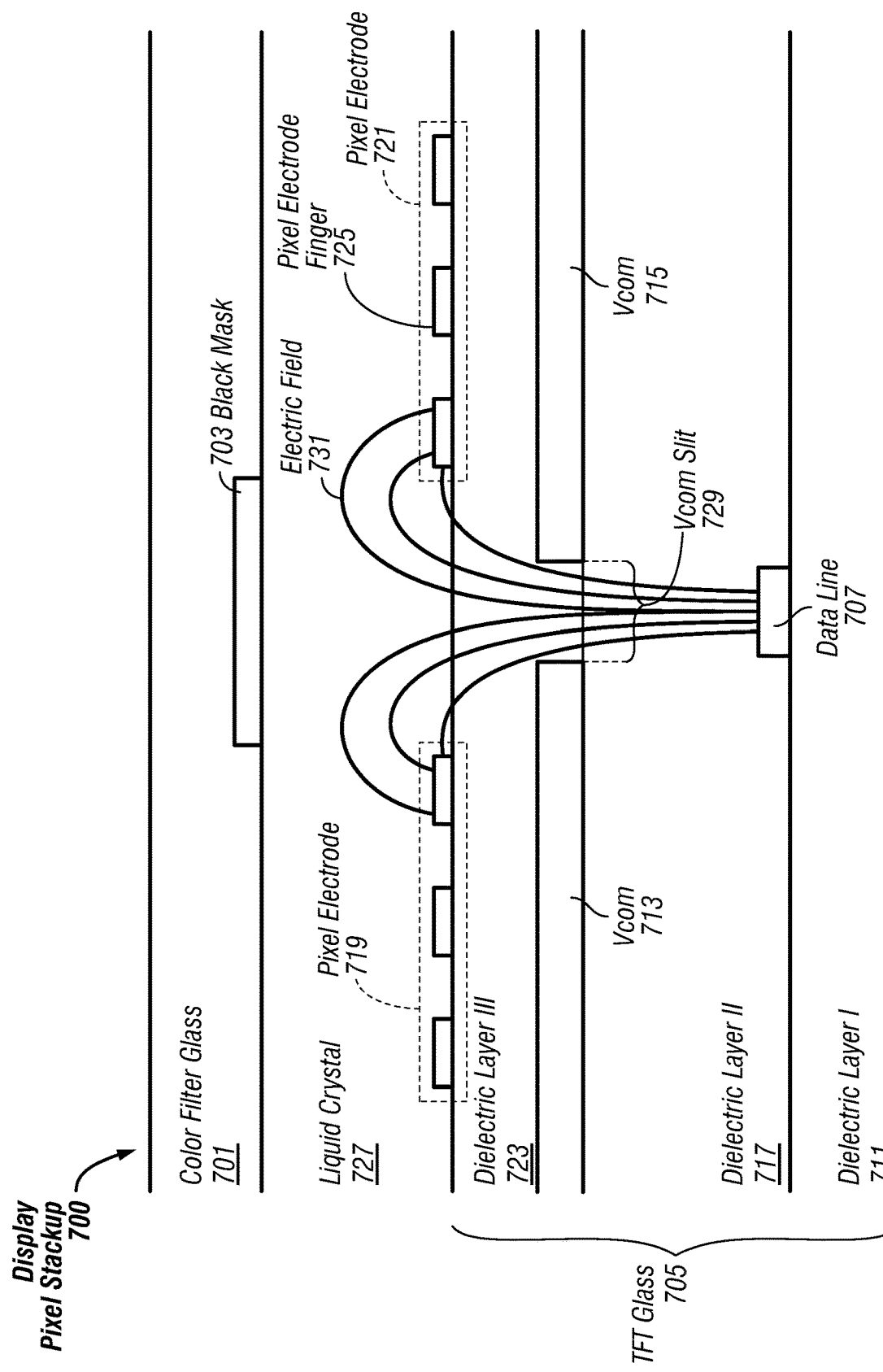
FIG. 7 illustrates a portion of an example display pixel stackup.

FIG. 7 illustrates a portion of an example display pixel stackup 700 including a color filter substrate, such as a color filter glass 701, and a TFT substrate, such as a TFT glass 705. Color filter glass 701 can provide a transparent cover that can include a color filter and a black mask 703. TFT glass 705 can include a data line 707 disposed on a dielectric layer I 711, a common electrode (Vcom) 713 and a common electrode (Vcom) 715 disposed on dielectric layer II 717, and a pixel electrode 719 and a pixel electrode 721 disposed on a dielectric layer III 723. Each pixel electrode includes multiple pixel electrode fingers 725. Pixel electrode fingers 725 can correspond to fingers 158 in FIG. 1D, for example. Although not illustrated, TFT substrate 705 can include gate lines and switching elements such as thin film transistors (TFTs) connected to both the gate and data lines for controlling voltages applied to the pixel electrodes. For example, one TFT can be associated with the pixel electrode of each sub-pixel. During a display operation, voltages applied to the common electrodes and to the pixel electrodes can create an electric field through a pixel material, such as liquid crystal 727 disposed between color filter glass 701 and TFT glass 705. In the case of liquid crystal, for example, the electric field can cause inclination of the liquid crystal molecules that can control the amount of light from a backlight (not shown) that passes through a transparent cover, such as color filter glass 701. The amount of light passing through color filter glass 701 can be based on an amount of inclination of the liquid crystal, which can be based on the strength of the electric field through the liquid crystal. Other pixel materials that can control and/or generate light based on an application of an electric field could be used.

In this example embodiment, one end of Vcom 713 and one end of Vcom 715 are separated by a distance to form an opening, a Vcom slit 729. In this example, Vcom 713 can be at least partially disposed between data line 707 and pixel electrode 719. Likewise, Vcom 715 can be at least partially disposed between data line 707 and pixel electrode 721. The opening, Vcom slit 729, formed between edges of Vcom 713 and Vcom 715 can allow an electric field 731 to be generated between data line 707 and pixel electrodes 719 and 721, particularly when there is a large voltage difference between a data line voltage and a pixel electrode voltage. Part of electric field 731 can pass through the pixel material, liquid crystal 727, and can result in an unintended inclination, i.e. a disinclination, of the liquid crystal molecules. In some cases, a disinclination caused by such an electric field can result in a visual artifact in the affected display pixels.

Figure 8:
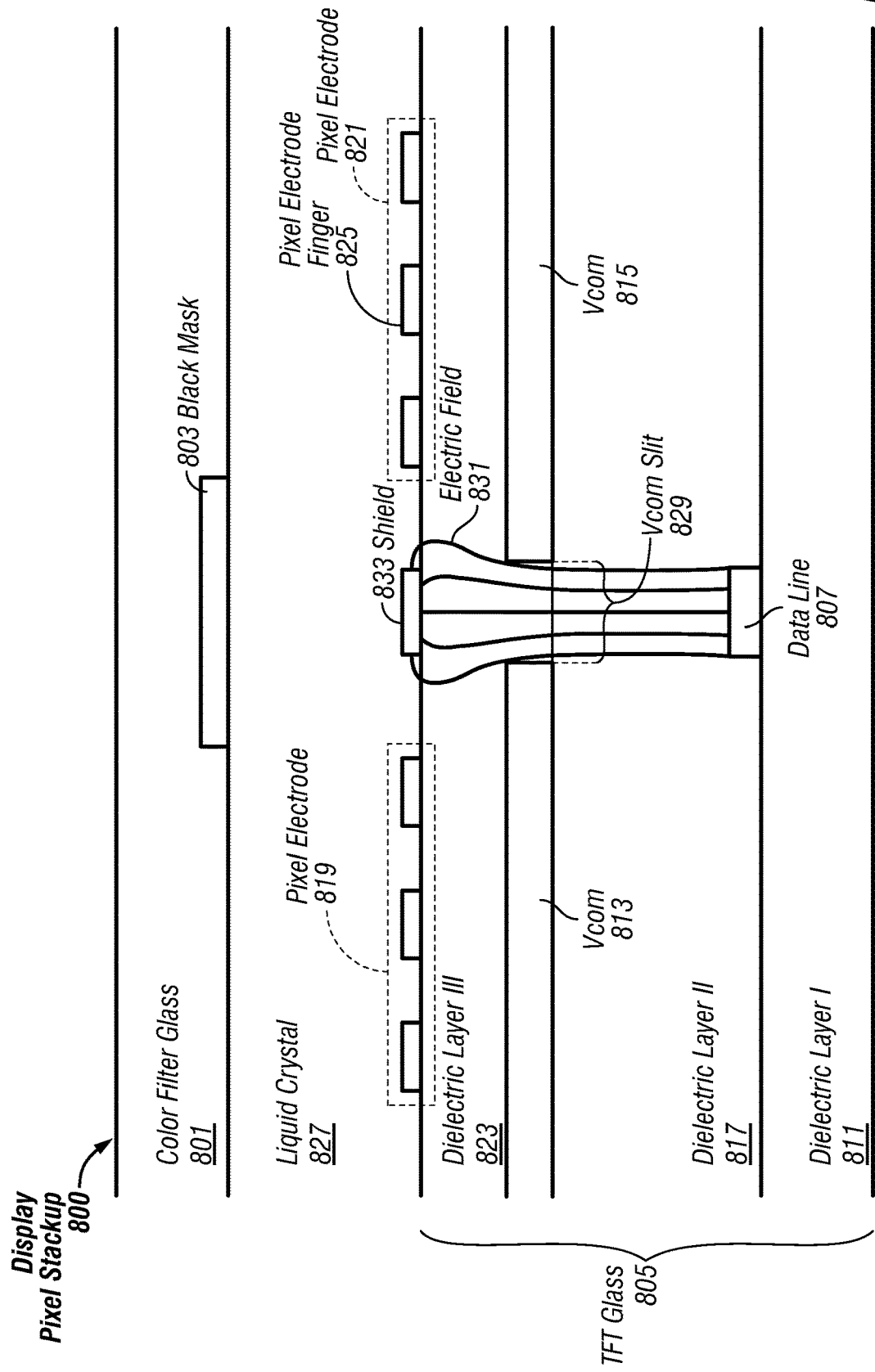
FIG. 8 illustrates a portion of an example display pixel stackup according to various embodiments.

FIG. 8 illustrates a portion of an example display pixel stackup 800 according to various embodiments. Similar to the example display pixel stackup shown in FIG. 7, display pixel stackup 800 can include a color filter substrate, such as a color filter glass 801 and a TFT substrate, such as a TFT glass 805. Color filter glass 801 can provide a transparent cover that can include a color filter and a black mask 803. TFT glass 805 can include a data line 807 disposed on a dielectric layer I 811, a Vcom 813 and a Vcom 815 disposed on a dielectric layer II 817, a pixel electrode 819 and a pixel electrode 821 disposed on a dielectric layer III 823, each pixel electrode including pixel electrode fingers 825, and liquid crystal 827. Pixel electrode fingers 825 can correspond to fingers 158 in FIG. 1D, for example. Although not illustrated, TFT substrate 805 can include gate lines and switching elements such as thin film transistors (TFTs)

connected to both the gate and data lines for controlling voltages applied to the pixel electrodes. For example, one TFT can be associated with the pixel electrode of each sub-pixel. Edges of Vcom 813 and Vcom 815 can form an opening, Vcom slit 829, that can allow an electric field 831 to extend from data line 807 through the Vcom layer. A shield 833 can be disposed between pixel electrode 819 and pixel electrode 821 such that Vcom slit 829 is substantially between shield 833 and data line 807. In this example embodiment, shield 833, Vcom slit 829, and data line 807 can be aligned with one another (in the vertical direction). Shield 833 can be connected to a voltage source such that electric field 831 is generated substantially between shield 833 and data line 807 to reduce or eliminate an amount of electric field between data line 807 and pixel electrodes 819 and 821. In this way, visual artifacts caused by disinclination of liquid crystal 827 caused by an electric field from data line 807 can be reduced or eliminated.

The voltage applied to shield 833 by the voltage source (not shown) can include, for example, ground, virtual ground, or any voltage source such that the electric fields that extend from data line 807 to pixel electrodes 819 and 821 through liquid crystal 827 are reduced or eliminated. The voltage can include, for example, a voltage applied to one or both of Vcom 813 and Vcom 815, etc. Shield 833 can be formed of, for example, a conductive material, such as a nontransparent conductor, a partially transparent conductor, etc. In this example embodiment, shield 833 can be formed in the same material layer as pixel electrodes 819 and 821; for example, the shield can be formed of a transparent conductor such as indium tin oxide (ITO).

Figure 9:
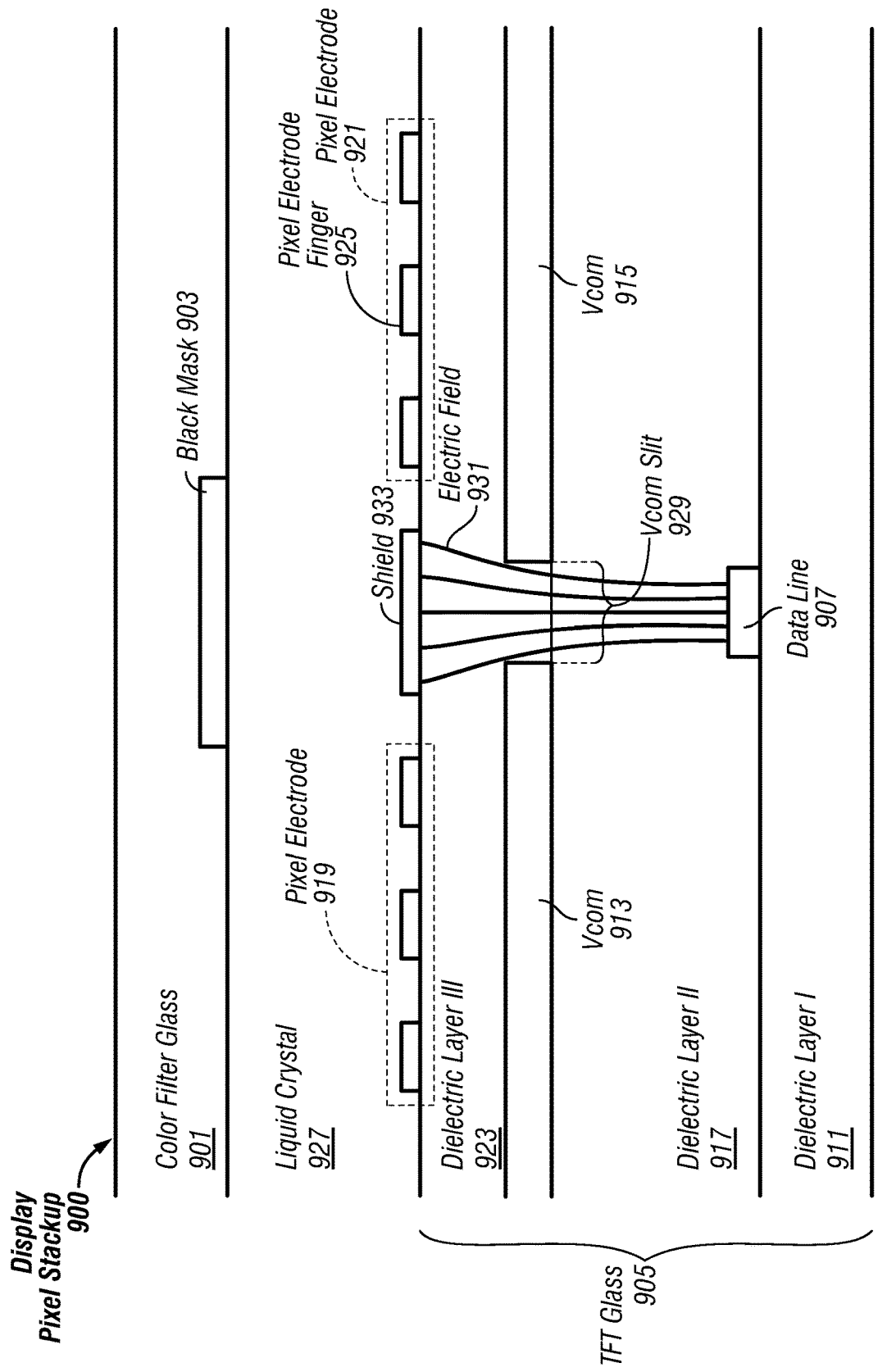
FIG. 9 illustrates a portion of another example display pixel stackup according to various embodiments.

FIG. 9 illustrates a portion of an example display pixel stackup 900 according to various embodiments. Similar to the display pixel stackup shown in FIG. 8, display pixel stackup 900 can include a color filter substrate, such as a color filter glass 901, and a TFT substrate, such as a TFT glass 905. Color filter glass 901 can include a color filter and a black mask 903. TFT glass 905 can include a data line 907 disposed on a dielectric layer I 911, a Vcom 913 and a Vcom 915 disposed on a dielectric layer II 917, a pixel electrode 919 and a pixel electrode 921 disposed on a dielectric layer III 923, each pixel electrode including pixel electrode fingers 925, and liquid crystal 927. Pixel electrode fingers 925 can correspond to fingers 158 in FIG. 1D, for example. Although not illustrated, TFT substrate 905 can include gate lines and switching elements such as thin film transistors (TFTs) connected to both the gate and data lines for controlling voltages applied to the pixel electrodes. For example, one TFT can be associated with the pixel electrode of each sub-pixel. Edges of Vcom 913 and Vcom 915 can form an opening, Vcom slit 929, that can allow an electric field 931 to extend from data line 907 through the Vcom layer.

A shield 933 can be disposed between pixel electrode 919 and pixel electrode 921 such that Vcom slit 929 is substantially between the shield and data line 907. In this example embodiment, shield 933, Vcom slit 929, and data line 907 can be aligned with one another (in the vertical direction). In comparison to the previous example embodiment of FIG. 8, shield 933 can be wider than shield 833. In this way, shield 933 can more fully cover Vcom slit 929 and can further reduce or eliminate visual artifacts caused by an electric field from data line 907.

Figure 10:
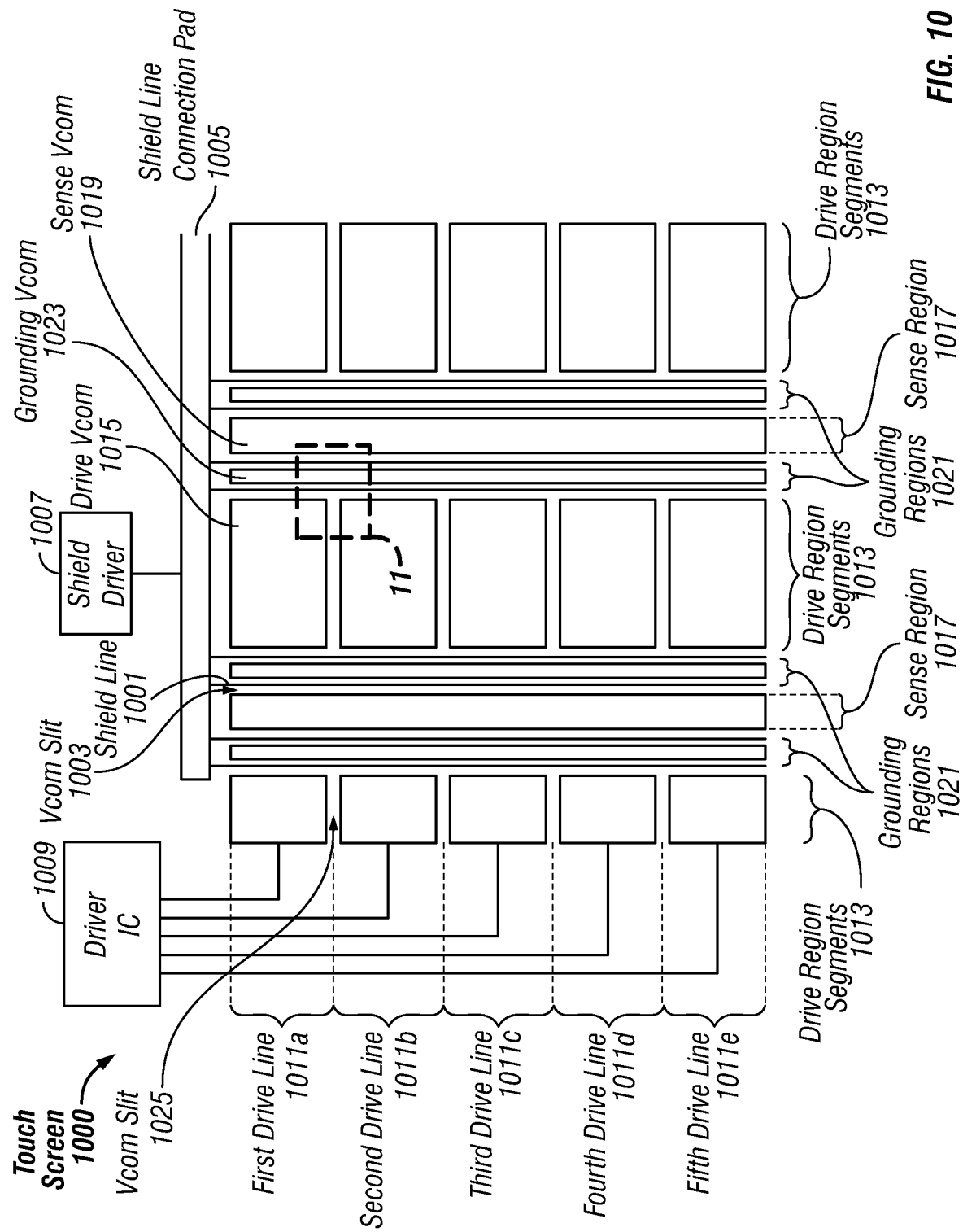
FIG. 10 illustrates an example touch screen including an example shield line system according to various embodiments.
Figure 11:
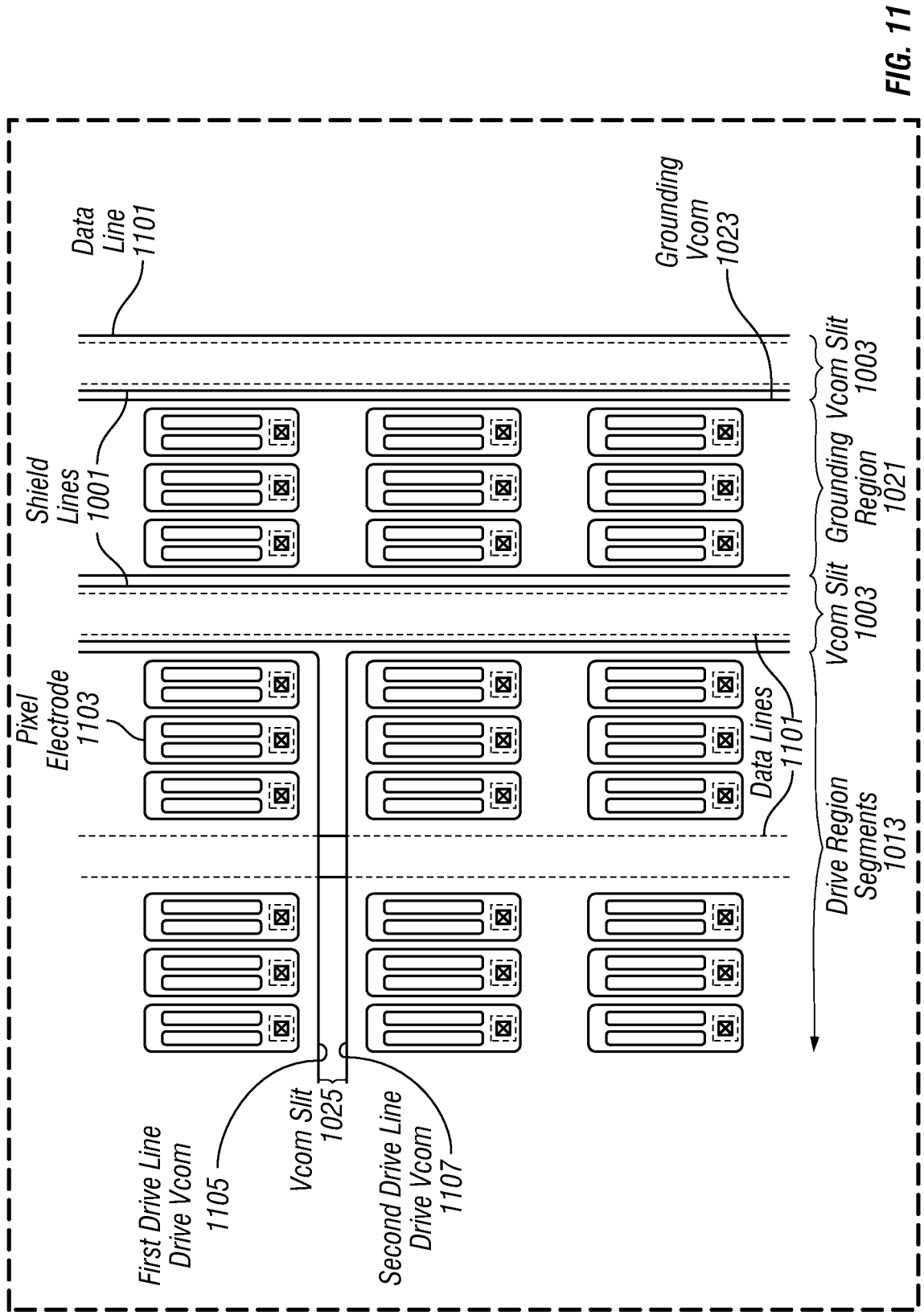
FIG. 11 illustrates a magnified view of a portion of the touch screen and the shield line system shown in FIG. 10.

FIG. 10 illustrates an example touch screen 1000 including an example shield line system according to various embodiments. FIG. 11 illustrates a magnified view of a portion of touch screen 1000 and the shield line system shown in FIG. 10. Referring to FIGS. 10 and 11, an example shield line system according to various embodiments will now be described. The example drive line system can include multiple shield lines 1001 over multiple Vcom slits 1003. Shield lines 1001 can be connected to a common shield line connection pad 1005 that can connect all of the shield lines to a shield driver 1007. Shield driver 1007 can apply a voltage to shield lines 1001 during operation to reduce or eliminate visual artifacts caused by an electric field from data lines 1101.

In this example embodiment, shield lines 1001 can be disposed over Vcom slits 1003 that are formed between edges of common electrodes that are used in different operational systems of the touch screen. FIGS. 10 and 11 illustrate three example operational systems of touch screen 1000. Touch screen 1000 includes a drive system that can include a driver integrated circuit (IC) 1009 that can stimulate multiple drive lines including a first drive line 1011a, a second drive line 1011b, a third drive line 1011c, a fourth drive line 1011d, and a fifth drive line 1011e with stimulation signals. Drive lines 1011a-e can each include multiple drive region segments 1013. In this example embodiment, each drive region segment 1013 can be formed of a single common electrode, drive Vcom 1015, that can run through multiple display pixels of touch screen 1000. For example, each drive Vcom 1015 can include a single, continuous common electrode layer of ITO that spans an entire block of multiple display pixels. Touch screen 1000 can also include a sense system that includes multiple sense regions 1017 that can be connected to sense channels (not shown) to receive sense signals to sense touch. In this example embodiment, each sense region 1017 can include a single, continuous common electrode layer of ITO that can span multiple display pixels of a block of display pixels as shown in FIG. 10.

Touch screen 1000 can also include a grounding system that can include multiple grounding regions 1021 disposed between the drive region segments 1013 and the sense regions 1017. Each grounding region 1021 can include a single grounding Vcom 1023 that can be connected to a ground, such as a virtual ground, to improve the touch sensing of the system.

Vcom slits 1003 can be formed between edges of common electrodes that form the conductive lines of different operational systems of the touch screen. For example, Vcom slits 1003 are formed between each drive region segment 1013 and each grounding region 1021. Likewise Vcom slits 1003 are formed between each grounding region 1021 and each sense region 1017. In this example embodiment, drive region segments 1013 of different drive lines can be separated by Vcom slits 1025. Data lines 1101 that are disposed under Vcom slits 1003 can be covered by shield lines 1001 to help reduce or eliminate visual artifacts that can be a consequence of undesirable electrical fields between data lines 1101 and pixel electrodes 1103 through Vcom slits, for example. In this example, shield lines are not disposed over data lines 1101 that are not disposed under a slit 1003. For example, referring to FIG. 11, some data lines 1101 run between display pixels associated with the same operational system of touch screen 1000. For example, FIG. 11 shows a data line 1101 running between display pixels of drive region segments 1013. In this example embodiment, in which each drive region segment 1013 includes a single drive Vcom spanning multiple display pixels, data lines 1101 that run through the drive region segments of the drive system can be substantially covered by drive Vcom. For example, FIG. 11 shows a data line 1101 that runs through drive region segments 1013 can be substantially covered by a first drive line drive Vcom 1105 and a second drive line drive Vcom 1107.

In example touch screen 1000, different sets of common electrodes of the display stackup can be conductively disconnected from other sets of common electrodes to form various conductive lines that can be used as touch sensing circuitry of the touch screen. Example touch screen 1000 shown in the FIGS. 10 and 11 can include conductive lines of three operational systems of the touch sensing circuitry: a drive system including drive lines formed of drive region segments that are each formed of a single drive Vcom, a sense system including sense regions that are each formed of a single sense Vcom, and a grounding system including grounding regions that are each formed of a single grounding Vcom. Some example embodiments can include more or fewer operational systems. For example, some embodiments can include only drive lines of a drive system, or sense lines of a sense system. In this case, for example, shield lines can be disposed over Vcom slits that are formed between regions of drive Vcom and regions of sense Vcom. In some embodiments, regions of Vcom associated with an operational system can include multiple Vcoms instead of a single Vcom. For example, in some embodiments, each display pixel can include a single Vcom that can be conductively connected to other Vcom within the same operational region.

Figure 12:
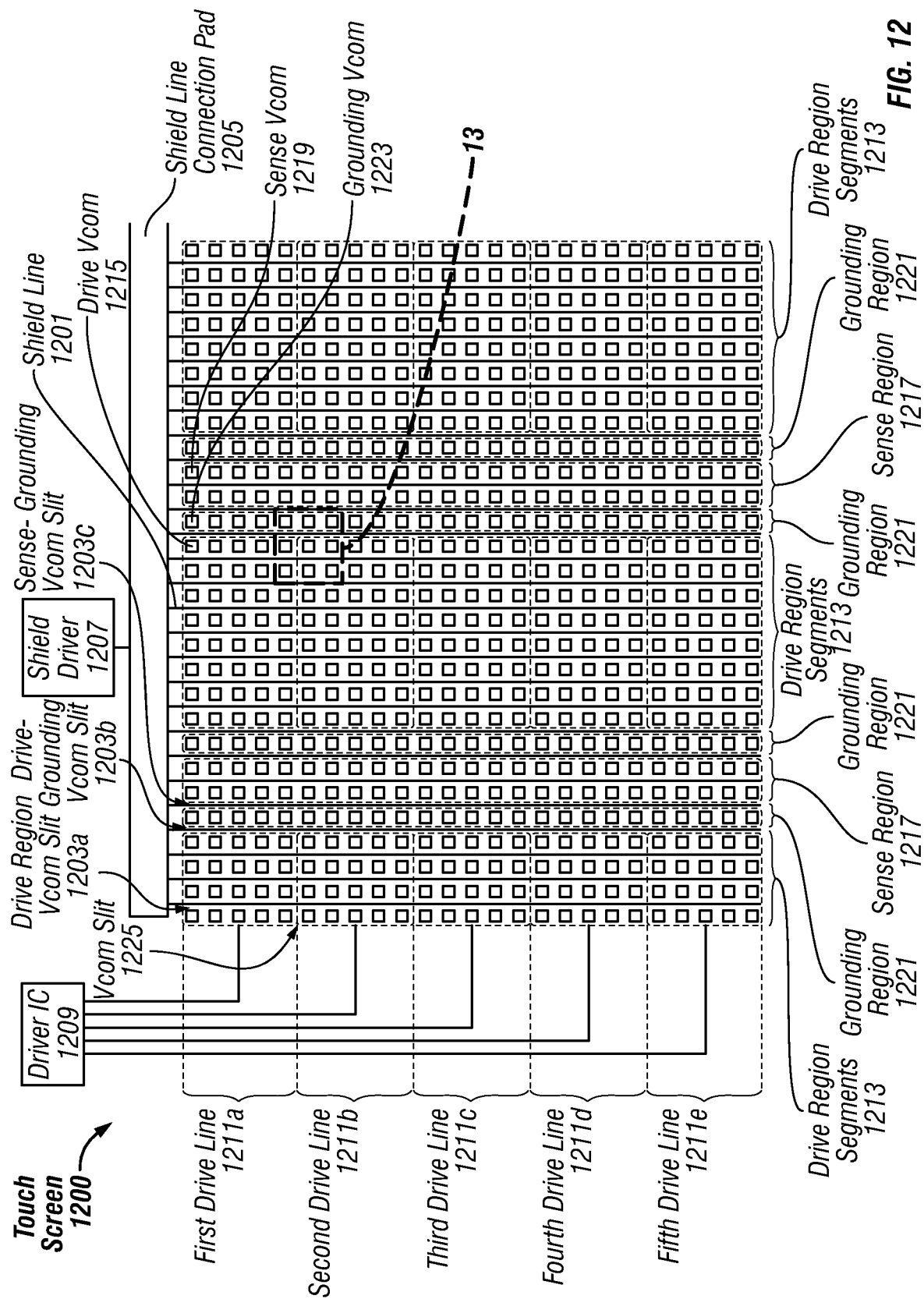
FIG. 12 illustrates an example touch screen including an example shield line system according to various embodiments.
Figure 13:
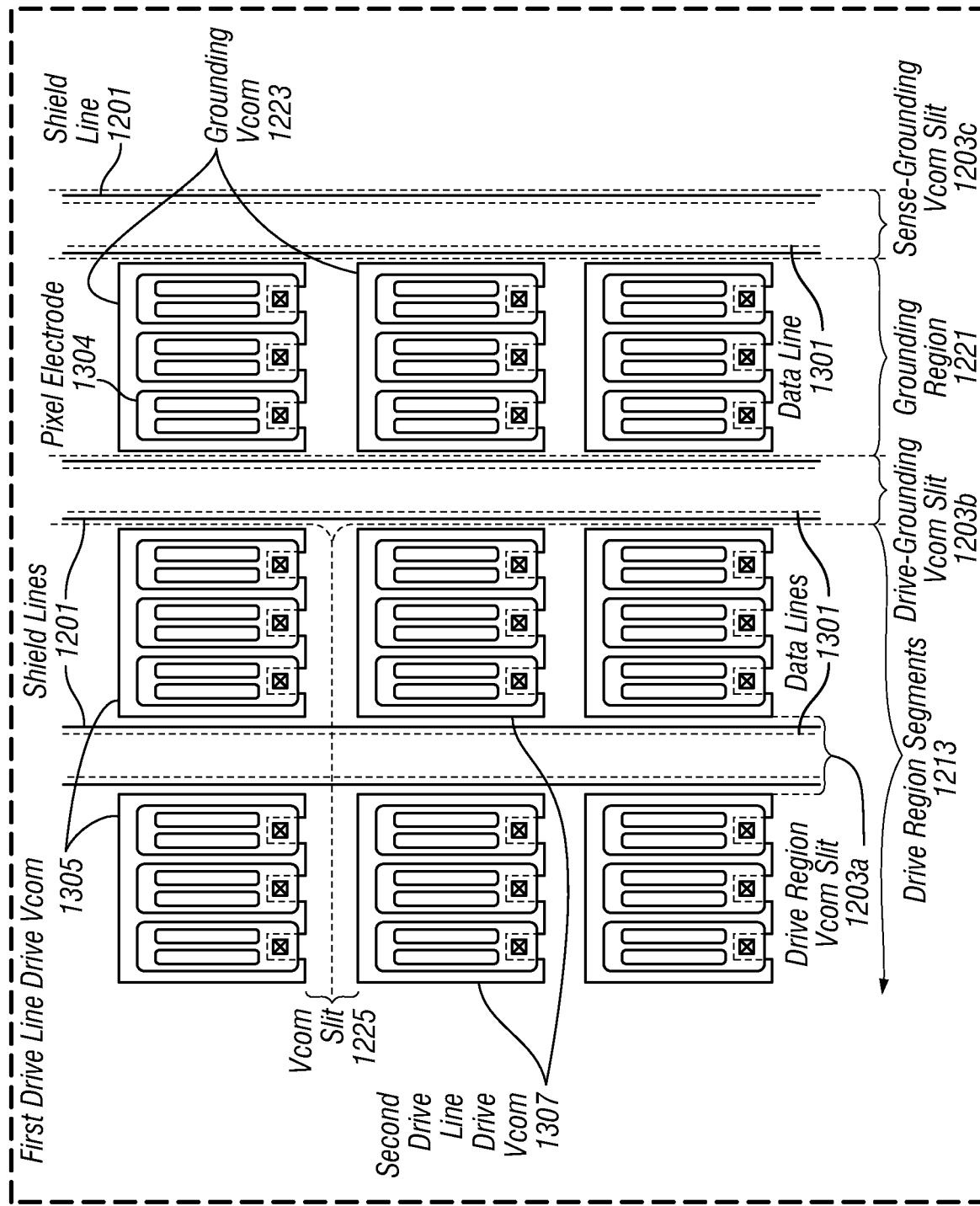
FIG. 13 illustrates a magnified view of a portion of the touch screen and the shield line system shown in FIG. 12.

FIG. 12 illustrates an example touch screen 1200 including an example shield line system according to various embodiments. FIG. 13 illustrates a magnified view of a portion of touch screen 1200. Similar to the example touch screen shown in FIGS. 10 and 11, touch screen 1200 includes a shield line system that includes multiple shield lines disposed over Vcom slits. In this example embodiment, various conductive lines, including drive region segments, sense regions, and grounding regions, of the operational systems of the touch sensing circuitry can be formed of sets of common electrodes. In this embodiment, each segment and region associated with each operational system can include multiple Vcoms. Each display pixel of touch screen 1200 can include a separate Vcom, which can be conductively connected to one or more other Vcoms of other display pixels, for example, as described above with reference to connection element 511 shown in FIG. 5.

Shield lines 1201 can be connected to a shield line connection pad 1205 that can connect all of the shield lines to a shield driver 1207. Shield driver 1207 can apply a potential to all of the shield lines 1201, such as a ground, a virtual ground, a fixed potential, a voltage applied to one or more Vcoms, etc. A driver IC 1209 can apply stimulation signals to drive lines such as a first drive line 1211a, a second drive line 1211b, a third drive line 1211c, a fourth drive line 1211d, and a fifth drive line 1211e. Each drive line can include multiple drive region segments 1213. In contrast to the example touch screen shown in FIGS. 10 and 11, each drive region segment 1213 can include multiple drive Vcoms 1215, where each drive Vcom can be associated with a single display pixel and connected together with other drive Vcoms within the drive region segment through a conductive connection structure, such as, for example, connection element 511 of FIG. 5. Likewise, each sense region 1217 of touch screen 1200 can include multiple sense Vcoms 1219, and each grounding region 1221 can include multiple grounding Vcoms 1223.

Consequently, Vcom slits can be formed between edges of Vcoms in each adjacent column of display pixels. Drive region Vcom slits 1203a can be formed between adjacent columns of drive Vcom 1215 in drive region segments 1213. Drive-grounding Vcom slits 1203b can be formed between drive Vcoms 1215 and grounding Vcoms 1223. Sense-grounding Vcom slits 1203c can be formed between sense Vcom 1219 and grounding Vcom 1223. Vcom slits 1225 can run through and between drive region segments 1213.

Data lines 1301 that are disposed under drive region Vcom slits 1203a, drive-grounding Vcom slits 1203b, and sense-grounding Vcom slits 1203c can be covered by shield lines 1201 to help reduce or eliminate visual artifacts that can be a consequence of undesirable electrical fields between data lines 1301 and pixel electrodes 1304 through Vcom slits, for example.

Figure 14:
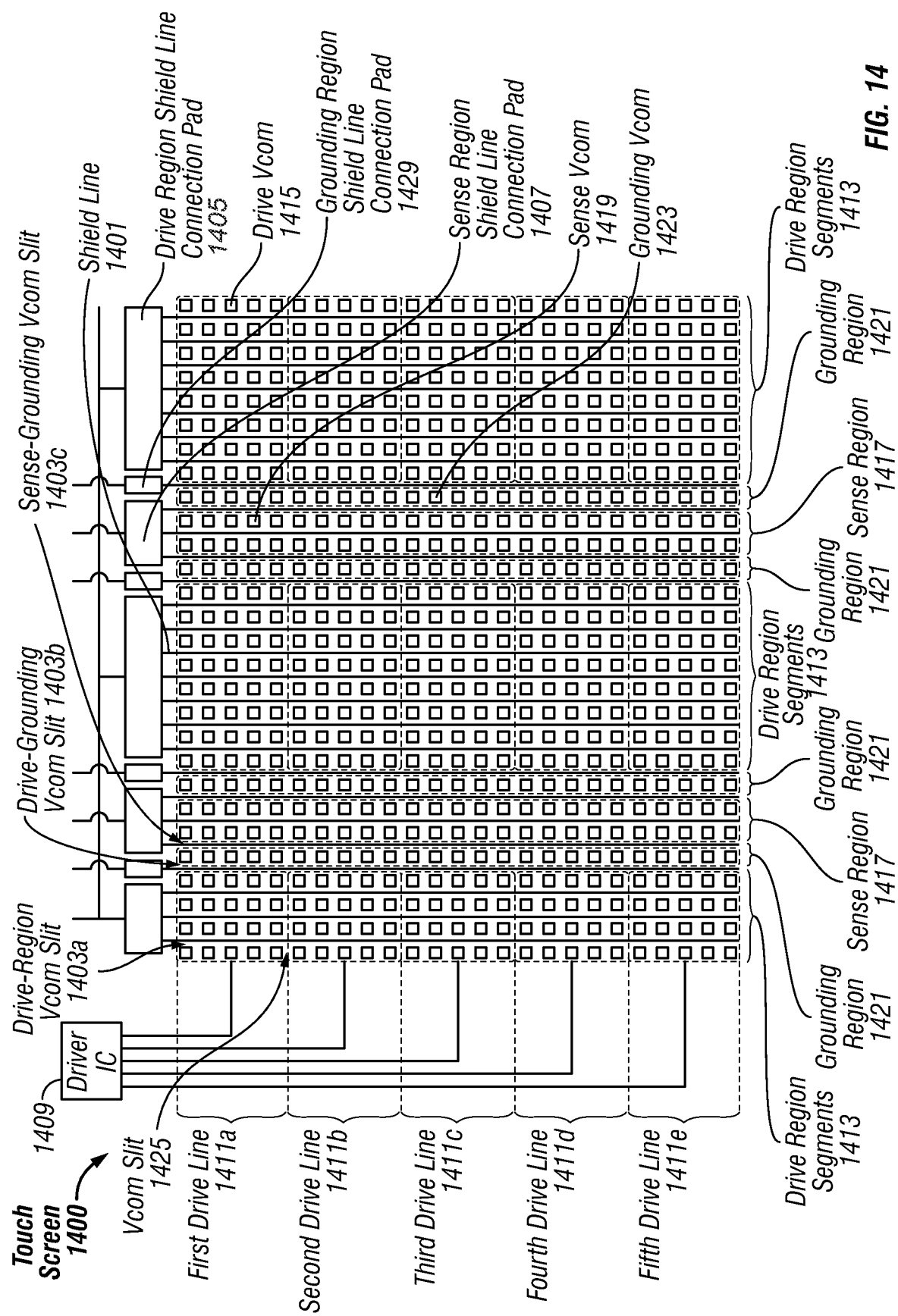
FIG. 14 illustrates an example touch screen including an example shield line system according to various embodiments.
Figure 15:
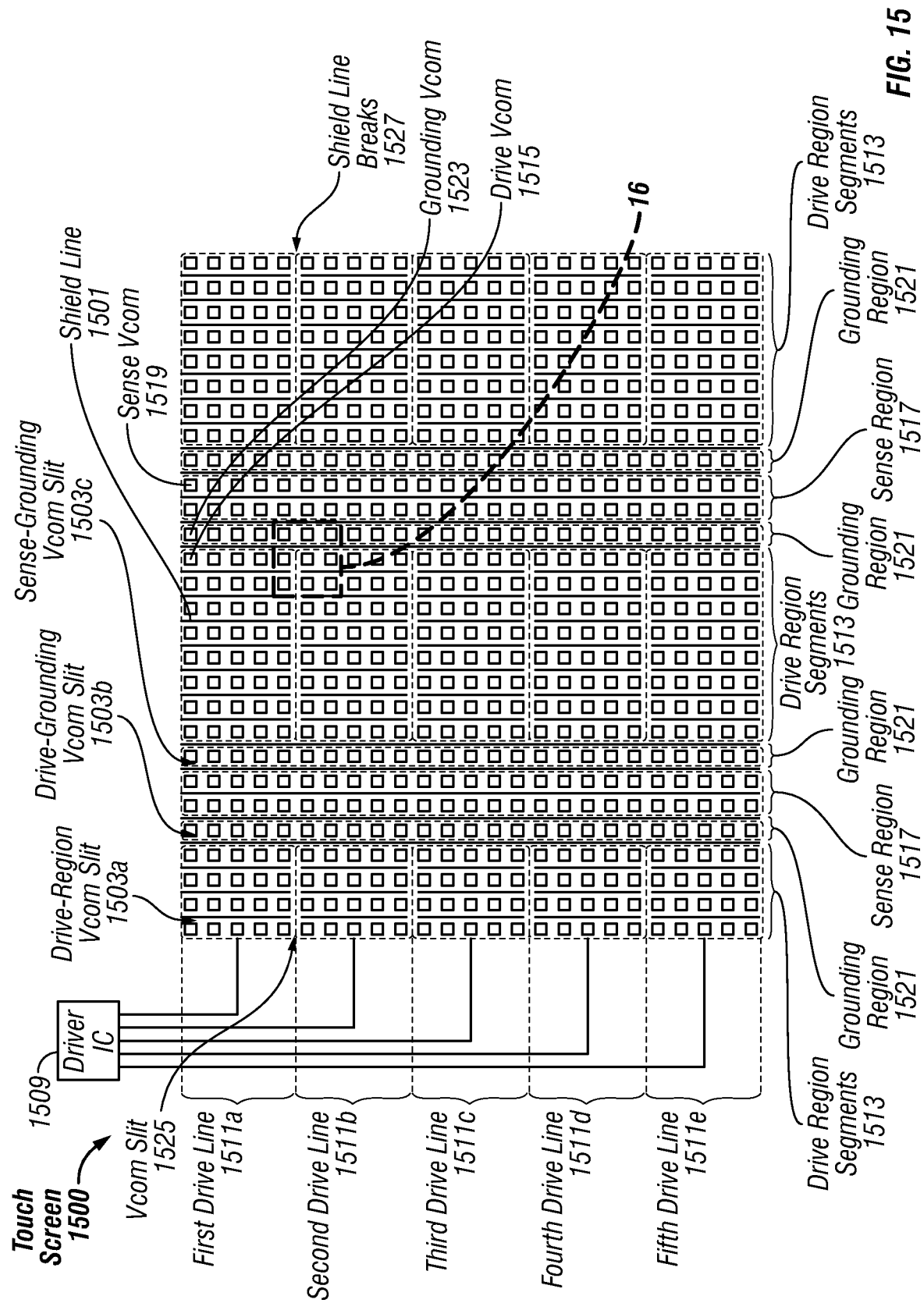
FIGS. 15, 16, and 17A-C illustrate another example touch screen including another example shield line system according to various embodiments.

FIG. 14 illustrates an example touch screen 1400 including an example shield line system according to various embodiments. Similar to the example touch screen shown in FIGS. 12-13, touch screen 1400 can include various conductive lines, including drive region segments, sense regions, and grounding regions of the operational systems of the touch sensing circuitry.

A driver IC 1409 can apply stimulation signals to drive lines such as a first drive line 1411a, a second drive line 1411b, a third drive line 1411c, a fourth drive line 1411d, and a fifth drive line 1411e. Each drive line can include multiple drive region segments 1413. Similar to the example touch screen shown in FIGS. 12 and 13, each drive region segment 1413 can include multiple drive Vcoms 1415, where each drive Vcom can be associated with a single display pixel and connected together with other drive Vcoms within the drive region segment through a conductive connection structure, such as, for example, connection element 511 of FIG. 5. Likewise, each sense region 1417 of touch screen 1400 can include multiple sense Vcoms 1419, and each grounding region 1421 can include multiple grounding Vcoms 1423.

Vcom slits can be formed between edges of Vcoms in each adjacent column of display pixels. Drive region Vcom slits 1403a can be formed between adjacent columns of drive Vcom 1415 in drive region segments 1413. Drive-grounding Vcom slits 1403b can be formed between drive Vcoms 1415 and grounding Vcoms 1423. Sense-grounding Vcom slits 1403c can be formed between sense Vcom 1419 and grounding Vcom 1423. Vcom slits 1425 can run through and between drive region segments 1413.

Shield lines 1401 that run through drive region segments 1413 can each be connected to one of multiple drive region shield line connection pads 1405. All of the drive region shield line connection pads 1405 can be connected together and all connected to a single voltage source (not shown) that can apply a voltage to all of the shield lines 1401 in the drive region segments 1413. Shield lines 1401 that run through each sense region 1417 can each be connected to one of multiple sense region shield line connection pads 1407. Each sense region shield line connection pad 1407 can be connected to a separate voltage source (not shown), such that shield lines 1401 in each sense region 1417 can be driven independently of each other, and driven independently of shield lines associated with the drive and grounding regions. Shield lines 1401 running through grounding regions 1421 can each be connected to one of multiple grounding region shield lines connection pads 1429, each of which can be connected to a separate voltage source (not shown), such that shield lines 1401 in each grounding region 1421 can be driven independently of each other, and driven independently of shield lines associated with the drive and sense regions.

As shown in FIG. 14, shield lines in each operational system region can be kept conductively disconnected from shield lines associated with other operational systems regions. Furthermore, it can be seen that shield lines 1401 associated with a particular region or region segment of an operational system can be kept conductively disconnected from shield lines of other segments or regions of the same operational system, such as shown for the sense system and the grounding system. In this way, undesirable signal coupling between different operational systems and/or between different regions of an operational system can be reduced or eliminated. For example, conductively disconnecting shield lines 1401 running through drive region segments 1413 from shield lines 1401 running through sense regions 1417 can help prevent stimulation signals applied to drive Vcom from being coupled into sense Vcom of the sense regions through the shield line system.

FIGS. 15, 16, and 17A-C illustrate an example touch screen 1500 including an example shield line system according to various embodiments. As in the example touch screens shown in FIGS. 12, 13, and 14, each display pixel of touch screen 1500 can be associated with an individual Vcom.

Similar to the foregoing example embodiment of FIGS. 12 and 13, a driver IC 1509 of touch screen 1500 can apply stimulation signals to drive lines such as a first drive line 1511a, a second drive line 1511b, a third drive line 1511c, a fourth drive line 1511d, and a fifth drive line 1511e. Each drive line can include multiple drive region segments 1513. Similar to the example touch screen shown in FIGS. 12 and 13, each drive region segment 1513 can include multiple drive Vcoms 1515, where each drive Vcom can be associated with a single display pixel and connected together with other drive Vcoms within the drive region segment through a conductive connection structure. Each sense region 1517 of touch screen 1500 can include multiple sense Vcoms 1519 that can be conductively connected with a connection element (not shown), and each grounding region 1521 can include multiple grounding Vcoms 1523. In this example, grounding region 1521 can include a single column of grounding Vcoms 1523 that can be connected together with a connection element (not shown).

Vcom slits can be formed between edges of Vcoms in each adjacent column of display pixels. Drive region Vcom slits 1503a can be formed between adjacent columns of drive Vcom 1515 in drive region segments 1513. Drive-grounding Vcom slits 1503b can be formed between drive Vcoms 1515 and grounding Vcoms 1523. Sense-grounding Vcom slits 1503c can be formed between sense Vcom 1519 and grounding Vcom 1523. Vcom slits 1525 can run through and between drive region segments 1513.

Data lines 1601 disposed under drive region Vcom slits 1503a, drive-grounding Vcom slits 1503b, and sense-grounding Vcom slits 1503c can be covered by shield lines 1501 to help reduce or eliminate visual artifacts that can be a consequence of undesirable electrical fields between data lines 1601 and pixel electrodes 1604 through Vcom slits, for example.

In this example embodiment, each shield line 1501 can be conductively connected to the Vcom of the region or region segment in which the shield line is disposed. Consequently, the voltage applied to each shield line 1501 can be the voltage that is applied to the Vcom of the segment or region of the shield line. In this way, shield lines 1501 can be connected to on-panel voltage sources and the need for an off-panel shield driver and connection pads can be eliminated. In addition, each shield line 1501 can be conductively disconnected from Vcom in other regions and region segments, which can reduce or eliminate undesirable coupling of signal between different operational systems, such as the drive and sense systems, and between different regions in the same operational system, such as between different drive lines.

Figure 16:
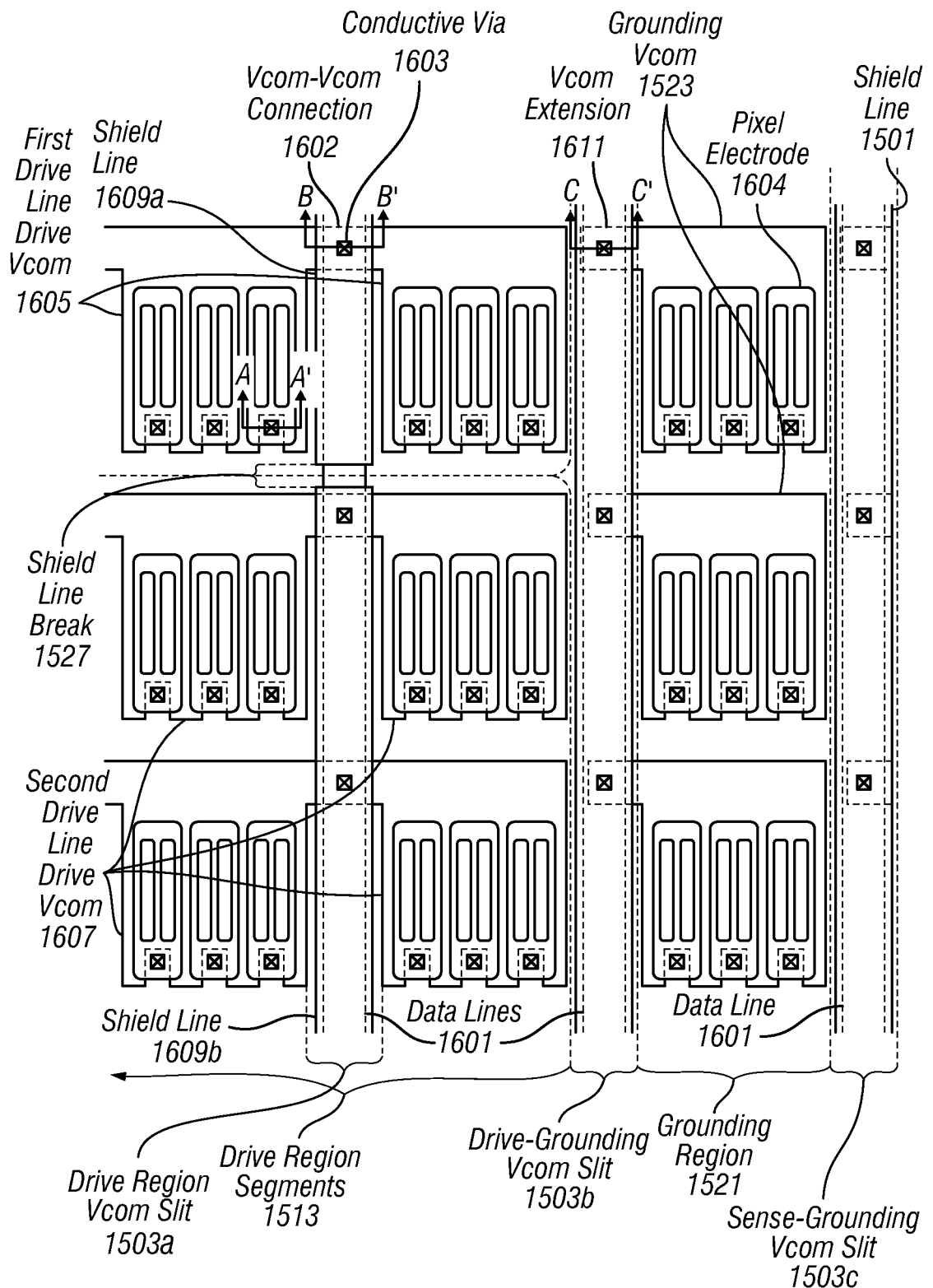

For example, FIG. 16 shows a Vcom-Vcom connection 1602 that can conductively connect adjacent Vcoms within a particular drive region segment 1513. Vcom-Vcom connection 1602 can be formed in the Vcom material layer of the stackup, for example, as an extension of Vcom material between the edges of adjacent Vcoms. Conductive connections, such as conductive vias 1603, can connect shield lines 1501 to Vcom-Vcom connections 1602, such that the shield lines can be conductively connected to Vcoms within the region or region segment of the shield line.

Breaks in shield lines can conductively disconnect shield lines in one region or region segment from shield lines in another region or region segment. For example, a shield line break 1527 can disconnect a shield line between a first drive line drive Vcom 1605 and a second drive line drive Vcom 1607 to form a shield line 1609a that can be conductively connected to first drive line 1511a only, and a shield line 1609b that can be conductively connected to second drive line 1511b only. In this way, for example, shield lines 1501 in a particular drive region segment 1513 can be driven independently of shield lines in other drive region segments, and driven independently of shield lines associated with the sense and grounding regions.

Although FIG. 16 shows a Vcom-Vcom connections 1602 can conductively connect adjacent Vcoms in a row of Vcoms, the columns of Vcoms (as well as the rows of Vcoms) of each region can be conductively connected through a connection element (not shown), such as connection element 511 of FIG. 5. In this regard, Vcom-Vcom connections 1602 can be used in place of or in conjunction with another connection element.

Each grounding Vcom 1523 can include a Vcom extension 1611 that can allow a shield line 1501 in drive-grounding Vcom slit 1503b to be connected to the grounding Vcoms through conductive vias 1603. Vcom extension 1611 can be formed in the Vcom material layer of the stackup, for example, as an extension of Vcom material. Conductive connections, such as conductive vias 1603, can connect shield lines 1501 to Vcom extensions 1611 such that the shield lines can be conductively connected to Vcoms within the region or region segment of the shield line. Unlike Vcom-Vcom connection 1602, Vcom extension 1611 can extend from a Vcom but not conductively connect with an adjacent Vcom. In this way, for example, Vcom extensions 1611 can be used to connect Vcoms to shield lines in Vcom slits between two different operational regions, such as shield lines 1501 in drive-grounding Vcom slits 1503b and shield lines in sense-grounding Vcom slits 1503c, while maintaining the conductive disconnection between the Vcoms of the different regions.

Likewise, shield lines 1501 that run through a particular sense region 1517 can each be connected to sense Vcom 1519 of the sense region, such that shield lines 1501 in a particular sense region 1517 can be driven independently of shield lines in other sense regions, and driven independently of shield lines associated with the drive and grounding regions.

In other words, different configurations of conductive connections, such as Vcom-Vcom connections 1602, Vcom extensions 1611 and conductive vias 1603, and other connection structures and conductive breaks such as shield line breaks 1527, can be used to provide a shield line system that can utilize on-panel voltage sources to drive the shield lines while reducing or eliminating undesirable signal coupling between touch circuit elements of different operational systems (such as a drive system and a sense system) and undesirable signal coupling between elements of the same operational system (such as a first drive line and a second drive line).

Figures 17A, 17B, 17C:
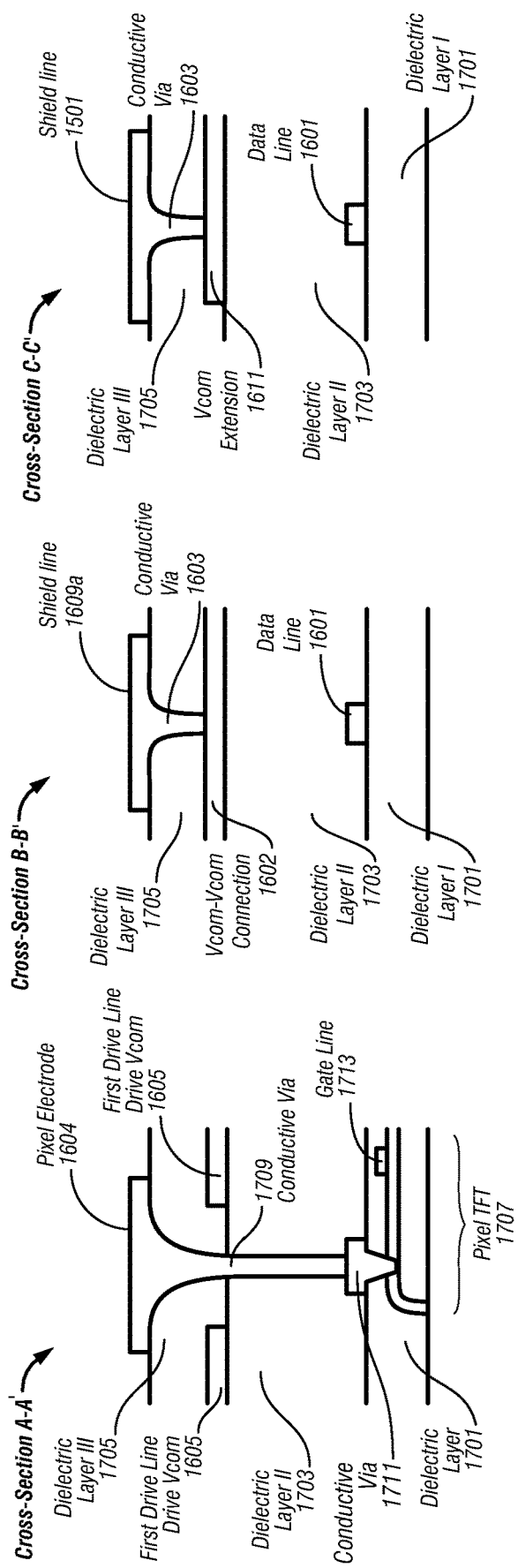

FIGS. 17A, 17B, and 17C show cross-sectional views of different conductive connections between material layers of touch screen 1500 along lines A-A', B-B', and C-C', respectively, shown in FIG. 16. FIGS. 17A-C include material layers that extend through each of the cross-sections, including a dielectric layer I 1701, a dielectric layer II 1703, and a dielectric layer III 1705. FIG. 17A illustrates an example connection of pixel electrode 1604 to a pixel TFT 1707 through a conductive via 1709 and a conductive via 1711. Pixel TFT 1707 can include a gate line 1713, and conductive via 1711 can connect to the drain of the TFT for electrical connection to pixel electrode 1604. Conductive via 1709 can be formed by etching a via in dielectric layer III 1705 and dielectric layer II 1703 to expose conductive via 1711 in an etching step of processing touch screen 1500, for example. A transparent conductor, such as ITO, can be deposited to fill in the via to form conductive via 1709 together with pixel electrode 1604 in a material deposition step of the process, for example.

FIGS. 17B and 17C illustrate an example process of forming conductive connections between shield lines and Vcoms of touch screen 1500 according to various embodiments. In this example, conductive via 1603 connected to shield line 1609a in FIG. 17B and conductive via 1603 connected to shield line 1501 in FIG. 17C can be formed during the same etching and deposition processing steps as the formation of conductive via 1709. In particular, during the etching step, a via can be formed through dielectric layer III 1705 to expose Vcom-Vcom connection 1602, as shown in FIG. 17B. Likewise, during the same etching step, a via can be formed through dielectric layer III 1705 to expose Vcom extension 1611, as shown in FIG. 17C. During the deposition step, the deposited transparent conductor can form shield line 1609a and the conductive via 1603 connecting the shield line to Vcom-Vcom connection 1602 of FIG. 17B. Likewise, during the same deposition step, the deposited transparent conductor can form shield line 1501 and the conductive via 1603 connecting the shield line to Vcom extension 1611 of FIG. 17C. In this way, for example, the connections between shield lines and corresponding Vcoms can be formed without requiring additional processing steps.

Figure 18:
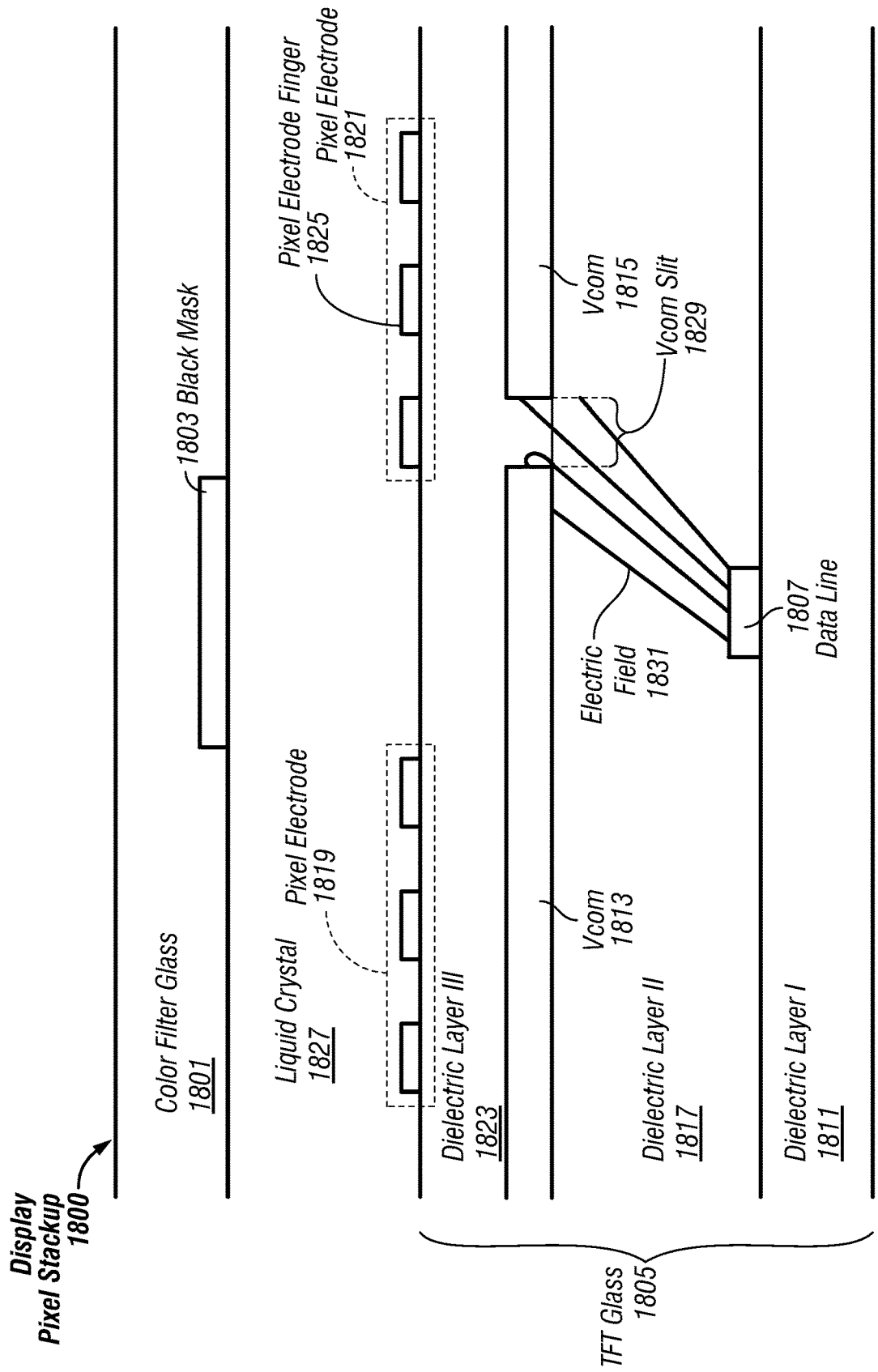
FIG. 18 illustrates a portion of an example display pixel stackup according to various embodiments.

FIG. 18 illustrates a portion of an example display pixel stackup 1800 according to various embodiments. Display pixel stackup 1800 can include a color filter substrate (e.g., glass) 1801, a black mask 1803 and a TFT substrate (e.g., glass) 1805 including a data line 1807 disposed on a dielectric layer I 1811, a common electrode (Vcom) 1813 and a common electrode (Vcom) 1815 disposed on dielectric layer II 1817, and a pixel electrode 1819 and a pixel electrode 1821 disposed on a dielectric layer III 1823. A pixel material, such as liquid crystal 1827, can be disposed between color filter glass 1801 and TFT glass 1805.

In this example embodiment, one end of Vcom 1813 and one end of Vcom 1815 are separated by a distance to form an opening, a Vcom slit 1829. In this example, Vcom 1813 can include a portion disposed under pixel electrode 1819 and a portion above data line 1807, and Vcom 1815 can include a portion disposed under pixel electrode 1821. Vcom slit 1829 can be disposed under another portion of pixel electrode 1821. In this embodiment, Vcom slit 1829 can be disposed under a pixel electrode finger closest to data line 1807. In this way, for example, an amount of an electric field 1831 that can reach liquid crystal 1827 from data line 1807 through Vcom slit 1829 can be reduced or eliminated.

Figure 19:
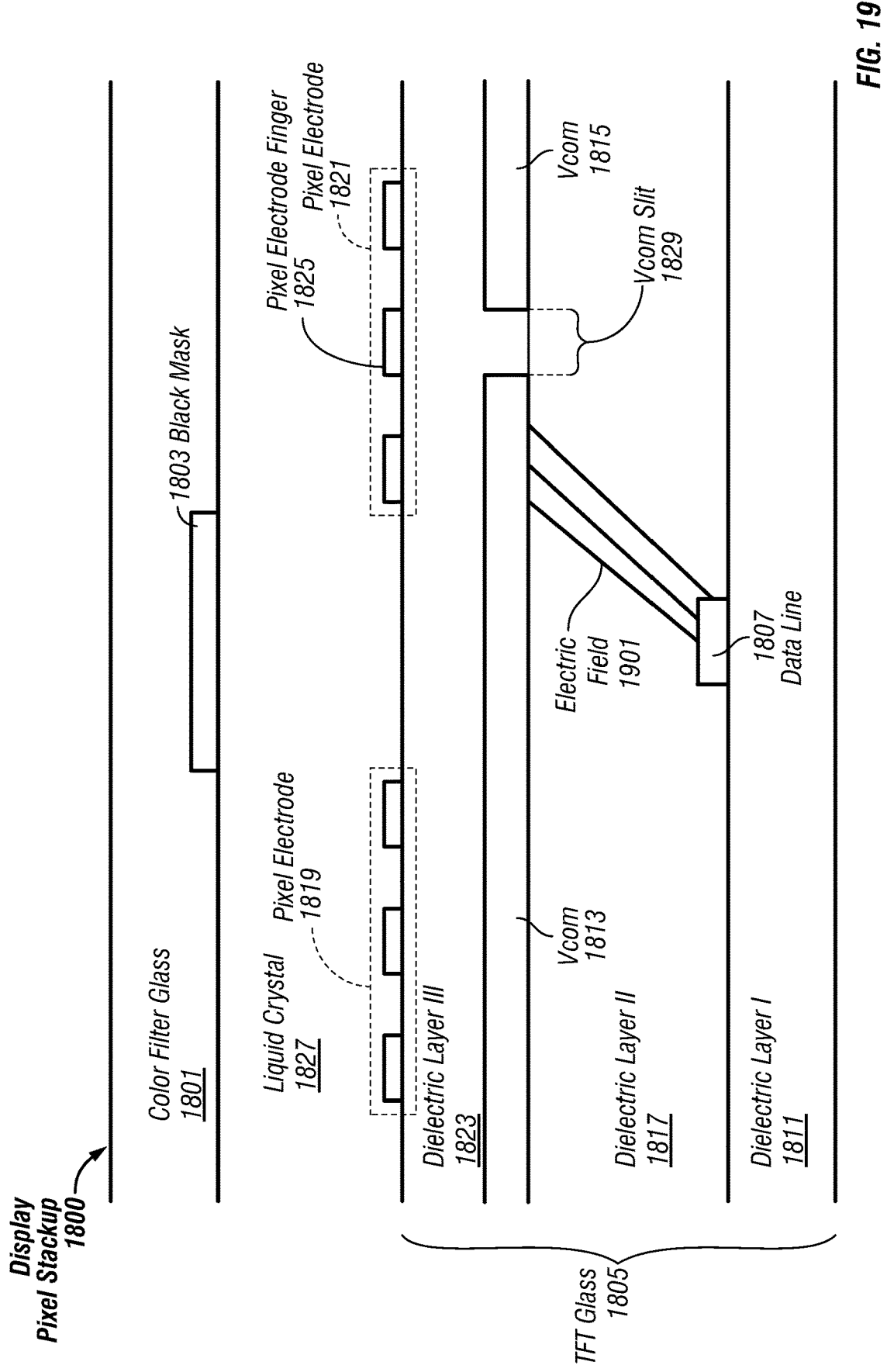
FIG. 19 illustrates a different example configuration of display pixel stackup shown in FIG. 18 according to various embodiments.

FIG. 19 illustrates a different example configuration of display pixel stackup 1800 according to various embodiments. In the example configuration shown in FIG. 19, Vcom slit 1829 can be shifted to be disposed under a middle pixel electrode finger 1825. In this example, an amount of an electric field 1901 that can reach liquid crystal 1827 from data line 1807 through Vcom slit 1829 can be further reduced or eliminated.

Figure 20:
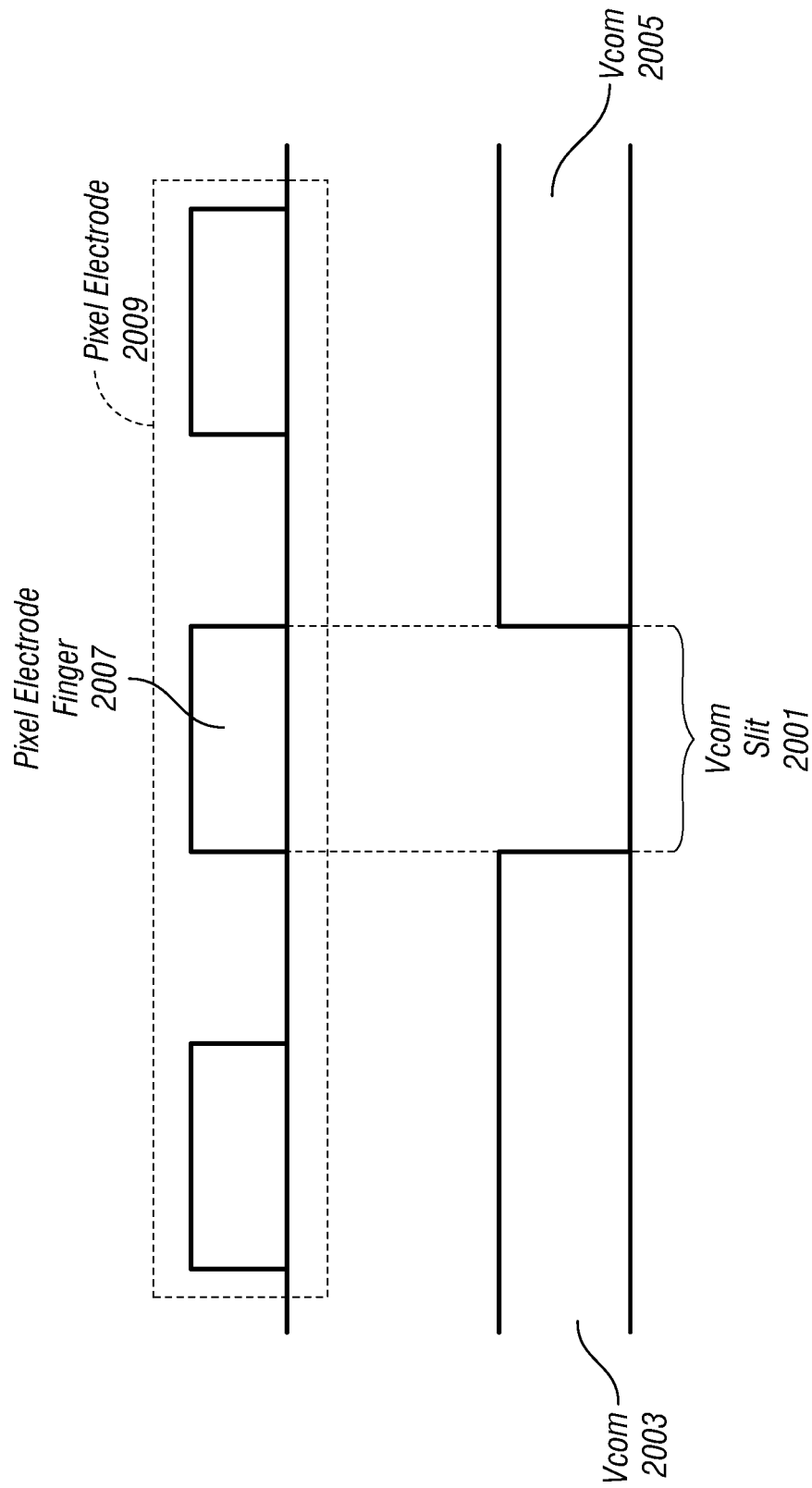
FIGS. 20-22 illustrate various example configurations of pixel electrode fingers and Vcom slits according to various embodiments.
Figure 21:
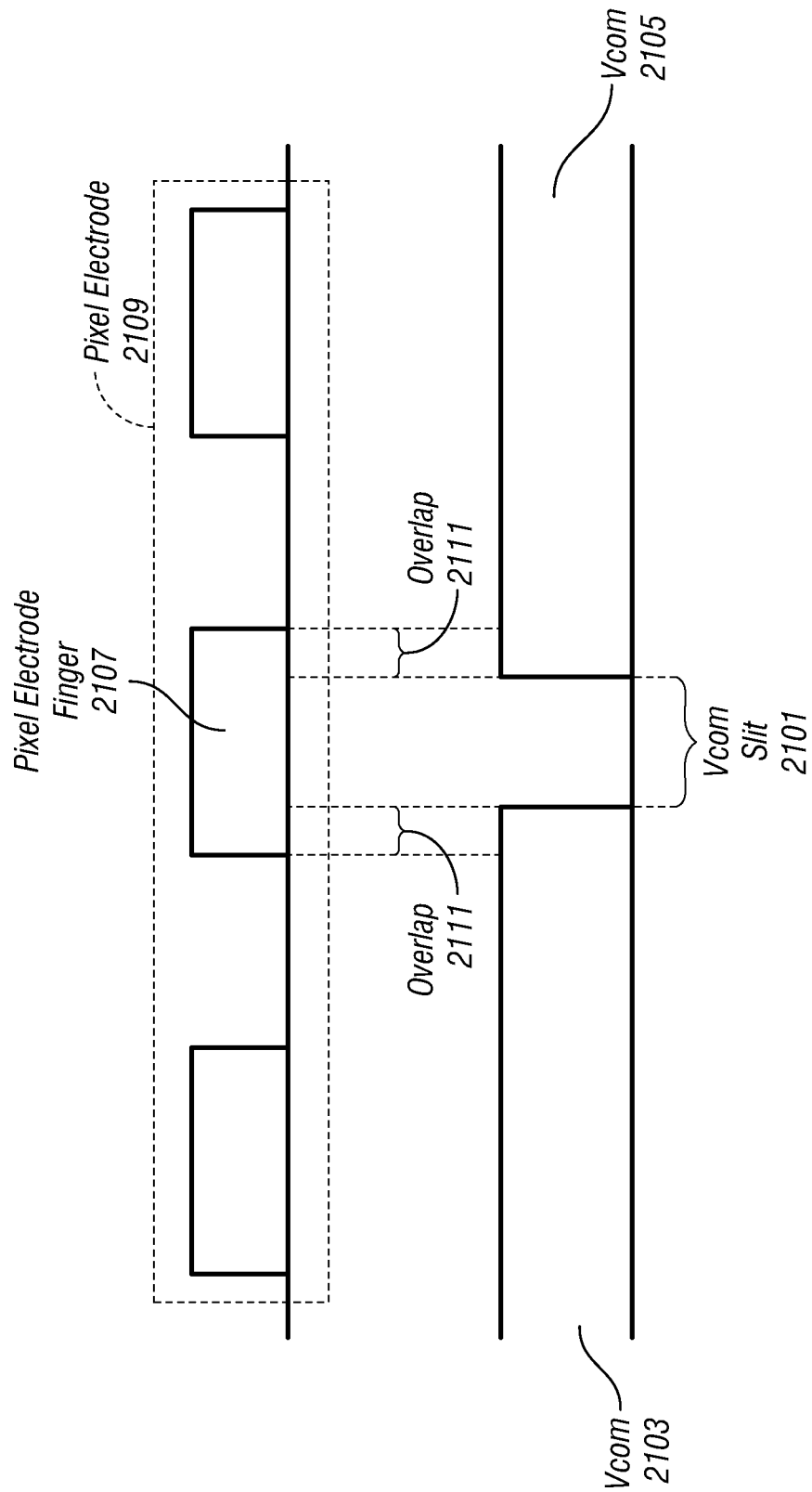
Figure 22:
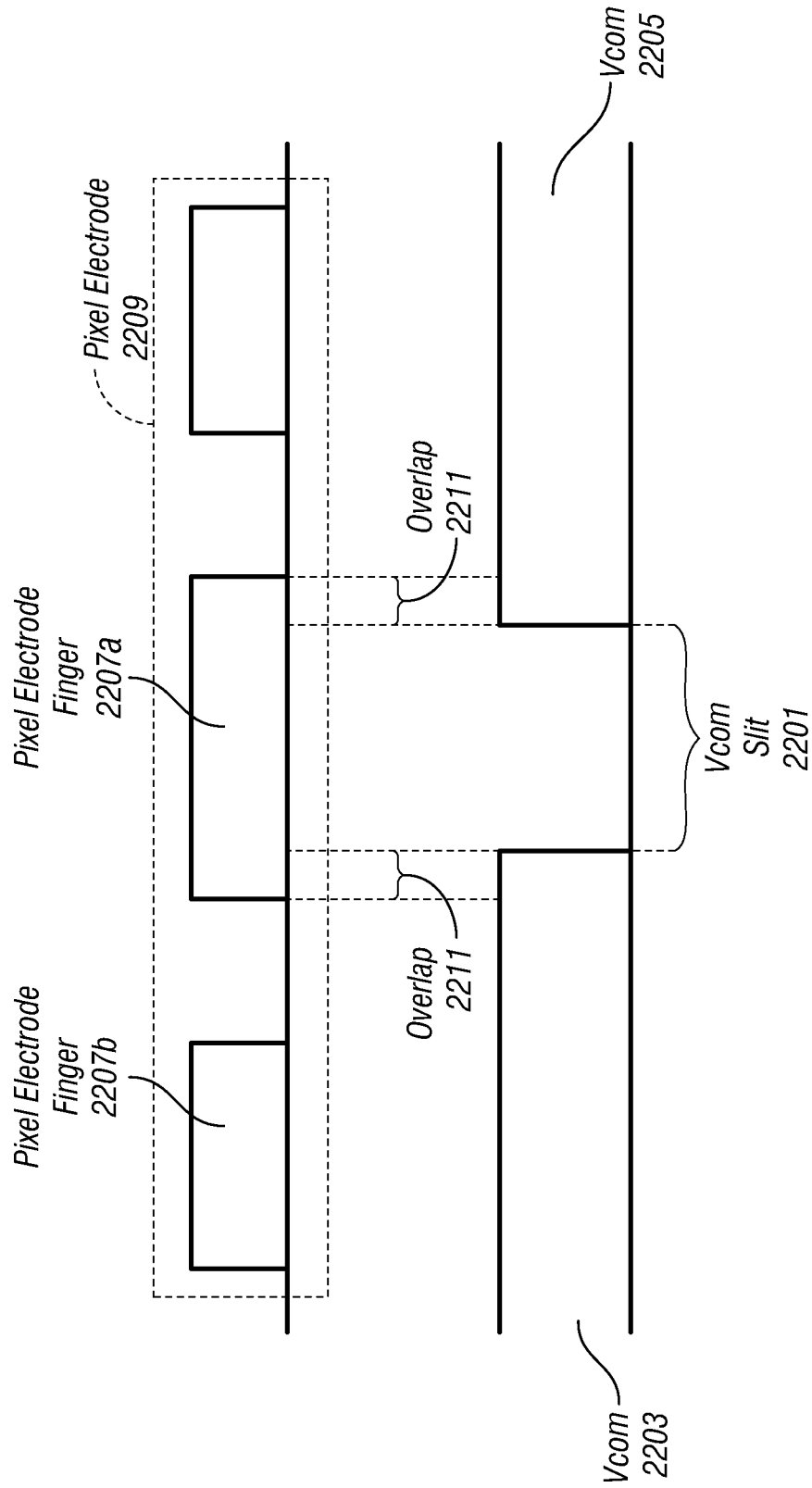

FIGS. 20-22 illustrate various example configurations of pixel electrode fingers and Vcom slits according to various embodiments. In FIG. 20, a Vcom slit 2001 between a Vcom 2003 and a Vcom 2005 can be under a pixel electrode finger 2007 of a pixel electrode 2009. The width of Vcom slit 2001 can be substantially the same as the width of pixel finger 2007, which can result in little or no overlap of the pixel electrode finger and Vcoms 2003 and 2005.

In FIG. 21, a Vcom slit 2101 between a Vcom 2103 and a Vcom 2105 can be under a pixel electrode finger 2107 of a pixel electrode 2109. The width of Vcom slit 2101 can be less than the width of pixel finger 2107, which can result in overlap 2111 of the pixel electrode finger and Vcoms 2103 and 2105. Overlap 2111 can help mitigate a loss of a pixel electrode-to-common electrode storage capacitance that can result from placing Vcom slit 2101 under pixel electrode 2109, for example.

In FIG. 22, a Vcom slit 2201 between a Vcom 2203 and a Vcom 2205 can be under an extended pixel electrode finger 2207a of a pixel electrode 2209. The width of extended pixel electrode finger 2207a can be greater than the width of pixel electrode finger 2207b, for example. The width of Vcom slit 2201 can be less than the width of extended pixel finger 2207a, which can result in overlap 2211 of the extended pixel electrode finger and Vcoms 2203 and 2205. Overlap 2211 can help mitigate a loss of a pixel electrode-to-common electrode storage capacitance that can result from placing Vcom slit 2201 under pixel electrode 2209, for example.

Although embodiments of this disclosure have been fully described with reference to the accompanying drawings, it is to be noted that various changes and modifications including, but not limited to, combining features of different embodiments, omitting a feature or features, etc., as will be apparent to those skilled in the art in light of the present description and figures.

For example, although specific materials and types of materials may be included in the descriptions of example embodiments, one skilled in the art will understand that other materials that achieve the same function can be used. In some embodiments, the drive lines and/or sense lines can be formed of other elements including, for example other elements already existing in typical LCD displays (e.g., other electrodes, conductive and/or semiconductive layers, metal lines that would also function as circuit elements in a typical LCD display, for example, carry signals, store voltages, etc.), other elements formed in an LCD stackup that are not typical LCD stackup elements (e.g., other metal lines, plates, whose function would be substantially for the touch sensing system of the touch screen), and elements formed outside of the LCD stackup (e.g., such as external substantially transparent conductive plates, wires, and other elements). For example, part of the touch sensing system can include elements similar to known touch panel overlays.

In this example embodiment, each sub-pixels can be a red (R), green (G) or blue (B) sub-pixel, with the combination of all three R, G and B sub-pixels forming one color display pixel. Although this example embodiment includes red, green, and blue sub-pixels, a sub-pixel may be based on other colors of light or other wavelengths of electromagnetic radiation (e.g., infrared) or may be based on a monochromatic configuration.

What is claimed is:

1. A display panel stackup comprising:
   a transparent cover;
   a plurality of pixel electrodes;
   a plurality of data lines;
   a plurality of common electrodes including a first common electrode and a second common electrode, the first common electrode having a first edge, at least a portion of the first common electrode being disposed under a first pixel electrode and above a first data line, at least a portion of the second common electrode being disposed under a second pixel electrode, the second common electrode having a second edge disposed at a distance from the first edge, the first and second edges forming a first opening free of conductive material between the first and second common electrodes; and
   a pixel material that controls an amount of light passing through the transparent cover based on a strength of an electric field through the pixel material,
   wherein the first opening between the first and second common electrodes is disposed under the second pixel electrode; and
   wherein the first opening defines a vertical region, and the first data line is located outside the vertical region.

2. The display panel stackup of claim 1, wherein the second pixel electrode includes a plurality of pixel electrode fingers, and the first opening is disposed under one of the plurality of pixel electrode fingers.

3. The display panel stackup of claim 2, wherein the first opening is a slit, and a width of the slit is less than or equal to a width of the pixel electrode finger disposed above the slit.

4. The display panel stackup of claim 3, wherein a width of the pixel electrode finger disposed over the slit is greater than a width of one or more other pixel electrode fingers of the second pixel electrode.

5. The display panel stackup of claim 1, wherein the first pixel electrode and the second pixel electrode are positioned on a same layer of the stackup.

6. The display panel stackup of claim 5, the first pixel electrode and the second pixel electrode forming a second opening therebetween, the display panel stackup further comprising black mask formed above the second opening.

7. The display panel stackup of claim 1, wherein the first common electrode and the second common electrode are biased at an electric potential different from a voltage of the first pixel electrode and the second pixel electrode.

8. The display panel stackup of claim 1, wherein the display panel stackup includes touch sensing circuitry including drive circuitry for driving drive lines connected at least to the first common electrode, and sense circuitry for receiving sense lines connected to at least the second common electrode.

9. The display panel stackup of claim 8, wherein the touch sensing circuitry further includes a grounding line disposed between at least one of the sense lines and at least one of the drive lines.

10. The display panel stackup of claim 8, the touch sensing circuitry including a plurality of operational systems including a first operational system and a second operational system, the first operational system including a first conductive line, the first conductive line including the first common electrode, and the second operational system including a second conductive line, the second conductive line including the second common electrodes;
    the display further comprising a first plurality of shields associated with the first conductive line and a second plurality of shields associated with the second conductive line;
    wherein the first plurality of shields is conductively disconnected from the second plurality of shields, the display further comprising:
    a first voltage source that applies a first voltage to the first plurality of shields; and
    a second voltage source that applies a second voltage to the second plurality of shields.

11. The display panel stackup of claim 10, the display further comprising:
    one or more first connection pads disposed in a border region of the display, the one or more first connection pads conductively connecting the first plurality of shields to the first voltage source; and
    one or more second connection pads conductively connecting the second plurality of shields to the second voltage source.

12. The display panel stackup of claim 10, wherein the first voltage source includes one of a ground and a voltage applied to common electrodes of the first conductive line.

* * * * *